United States Patent
Sako et al.

(10) Patent No.: US 7,242,767 B2
(45) Date of Patent: Jul. 10, 2007

(54) RECORDING MEDIUM, DATA RECORDING METHOD AND APPARATUS, DATA REGENERATING METHOD AND APPARATUS, AND COPY CONTROL METHOD

(75) Inventors: Yoichiro Sako, Tokyo (JP); Tatsuya Inokuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/128,685

(22) Filed: May 13, 2005

(65) Prior Publication Data

US 2005/0207325 A1    Sep. 22, 2005

Related U.S. Application Data

(63) Continuation of application No. 09/889,291, filed on Jul. 13, 2001, now Pat. No. 6,971,024.

(60) Provisional application No. PCT/JP00/08017, filed on Nov. 14, 2000.

(51) Int. Cl.
  *H04K 1/02* (2006.01)
  *H04K 1/06* (2006.01)
  *H04K 1/10* (2006.01)

(52) U.S. Cl. .......................... 380/22; 380/269; 380/42

(58) Field of Classification Search .................. 380/22, 380/269, 42
See application file for complete search history.

(56) References Cited

U.S. PATENT DOCUMENTS 5,546,461 A * 8/1996 Ibaraki et al. ............. 380/217
5,563,714 A   10/1996 Inoue et al.
5,621,794 A * 4/1997 Matsuda et al. ............ 380/217
5,802,174 A    9/1998 Sako et al.
5,901,127 A    5/1999 Sako et al.
5,915,017 A    6/1999 Sung et al.
6,005,940 A * 12/1999 Kulinets ..................... 705/51
6,167,136 A   12/2000 Chou
RE37,327 E    8/2001 Yonemitsu et al.
6,971,024 B1  11/2005 Sako et al.

FOREIGN PATENT DOCUMENTS

| EP | 790739 A2 * | 8/1997 |
| EP | 0942417 | 9/1999 |
| JP | 11-259972 | 9/1999 |
| JP | 11259972 | 9/1999 |

* cited by examiner

*Primary Examiner*—Gilberto Barron, Jr.
*Assistant Examiner*—Venkat Perungavoor
(74) *Attorney, Agent, or Firm*—Lerner, David, Littenberg, Krumholz & Mentlik, LLP

(57) ABSTRACT

Data is recorded in a first part PA1 in accordance with a signal format same as that of an existing CD at the lower limit (1.5 μm) of an allowable value of a Wreck pitch and the lower limit (1.2 m/sec) of a linear velocity. As a result, the data for the maximum regeneration time (74.7 min) can be recorded in the first part PA1. An existing CD reproducing apparatus can reproduce the audio data recorded in the first part PA1 with no problem. Moreover, compressed and encrypted audio data is recorded in a second part PA2 at a single density or a double density. The single density represents a recording density same as that of an existing CD and the double density represents a density two time larger than the single density. Furthermore, the audio data recorded in the second part PA2 is charged when reproduced in order to protect copyrights. The format of the data recorded in the second part PA2 uses the format of a CD-ROM.

14 Claims, 16 Drawing Sheets

FORMAT OF Q CHANNEL

FORMAT OF DATA BIT BLOCK

FORMAT OF DATA BIT BLOCK

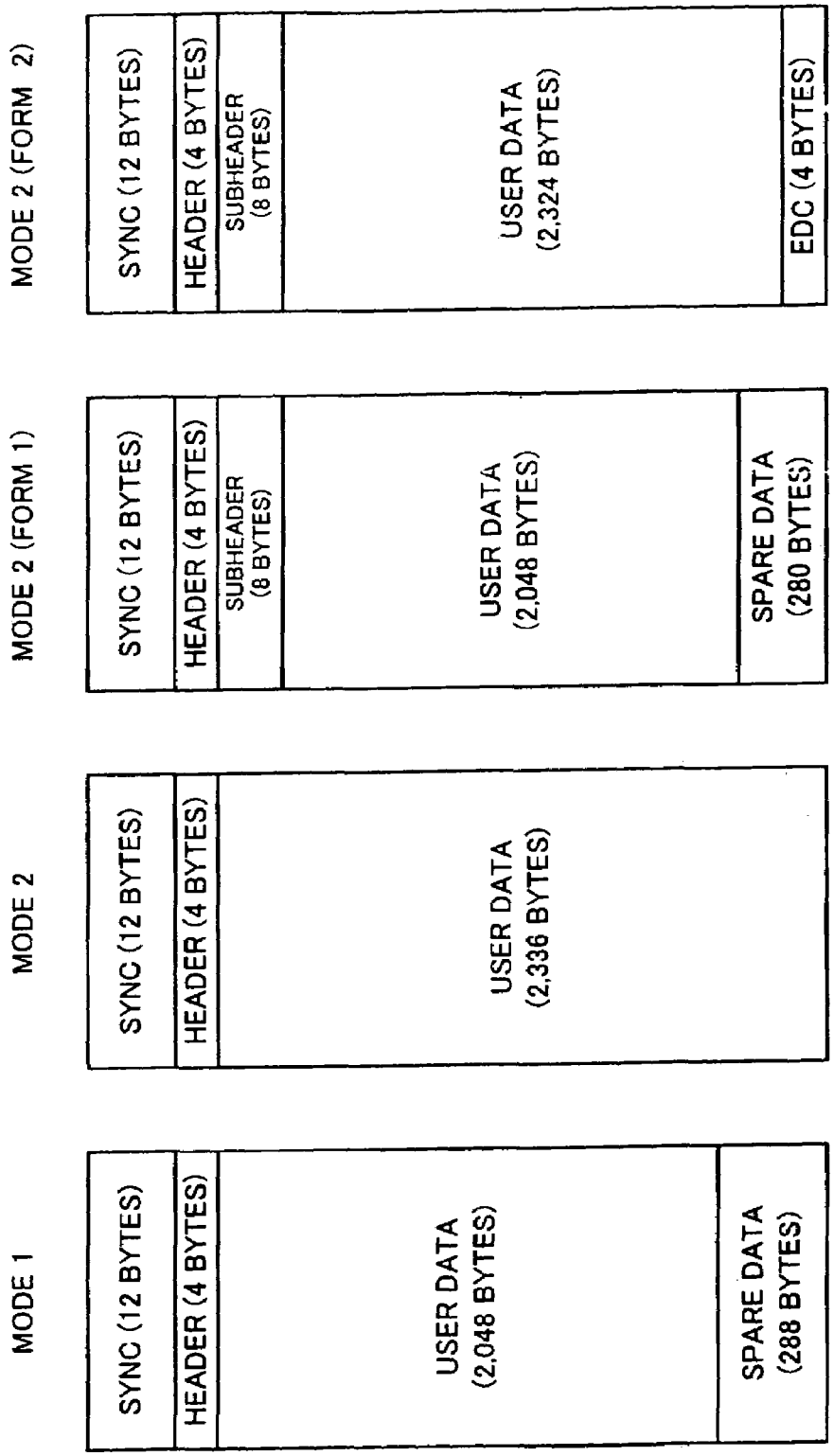

RECORDING MEDIUM, DATA RECORDING METHOD AND APPARATUS, DATA REGENERATING METHOD AND APPARATUS, AND COPY CONTROL METHOD

CROSS-REFERENCE TO RELATED APPLICATIONS

This application is a continuation application of application Ser. No. 09/889,291 filed Jul. 13, 2001, now U.S. Pat. No. 6,971,024, the disclosure of which is hereby incorporated by reference herein, which is a U.S. National Stage application of Application No. PCT/JP00/08017, filed Nov. 14, 2000, published in Japanese, which claims priority from Japanese Patent Application Nos. 326091/1999 filed on Nov. 16, 1999, and 334979/1999 filed on Nov. 25, 1999.

TECHNICAL FIELD

The present invention relates to recording medium, data recording method and apparatus, data reproducing method and apparatus, and a copy control method which are applied to a disc-like recording medium comatible with a so-called compact disc.

BACKGROUND ART

For compact disc (CD) and DVD (Digital Versatile Disc or Digital Video Disc) and the like, various copy-prevention arts for preventing illegal copy are proposed and practically used in order to protect copyrights. For example, SCMS (Serial Copy Management System) permits a first-generation copy from a CD to an MD (Mini Disc: trade mark) but inhibits a second-generation copy from an MD to other medium. Moreover, a copy-generation restriction system is also known which restricts what-th generation copy can be generated.

Moreover, music contents have been recently circulated in accordance with quick advancement of networks including Internet. Under the above situation, EMD (Electronic Music Distribution) using networks such as Internet and satellite broadcasting has been started and a copyright management method for EMD is proposed. In the case of EMD, a user can obtain music contents through charging. The above-described arts such as SCMS and copy generation restriction are going to be used for the EMD in order to prevent illegal copy.

As described above, the conventional copyright protection method has restricted copy by using a copy prevention art to protect the right of a writer. Therefore, the method has been an obstacle for circulating music contents widely in a short time. For example, a due system is one of conventional copyright protection systems. This system is executed by a DAT (Digital Audio Taperecorder) or MD, in which a user of a digital recorder pays a compensation added to a product price. In these days in which networks are advanced, hardware (player or medium) does not frequently correspond to contents distributed through a network one to one so that the contents are received by a personal computer and reproduced and therefore, it cannot be said that the above due system is suitable as a copyright protection system.

Moreover, a plurality of melodies are recorded in a medium such as a CD, a user may enjoy only one specific melody or only several melodies among the recorded melodies or may not want to buy the whole medium, that is, the DC. Furthermore, advertisement and circulation of music contents may be prevented due to a copying-prevention technique. It is possible to advertise and circulate the music contents for a short time by distributing the music contents free of charge and reduce the cost for advertisement and circulation of them.

When considering the above point, it is preferable to use a system in which contents are circulated and widely distributed free of charge and charged when reproducing the contents so that the contents are easily and quickly circulated and a writer can obtain a legal compensation. To realize the above system, it is necessary that contents recorded in a medium are encrypted. Moreover, it is considered to construct a system that is charged when the encrypted contents are reproduced. However, there is a problem that a recording medium storing encrypted contents such as a disk cannot be reproduced by an existing disk reproducing apparatus such as a CD reproducing apparatus.

Moreover, it is preferable that copy (redistribution) can be freely performed in addition to the fact that contents can be circulated and distributed free of charge. In this case, encrypted contents are copied. It is preferable that the copying time required is short.

Therefore, it is an object of the present invention to provide a recording medium storing contents that can be charged when decoded by being encoded while securing the compatibility with an existing data-recording medium.

Moreover, it is another object of the present invention to provide a recording medium for recording and reproducing data in and from the former recording medium and controlling copy, data recording method and apparatus, data reproducing method and apparatus, and a copy control method.

DISCLOSURE OF THE INVENTION

To solve the above problems, a data-recording medium for storing data by dividing a recording area into at least first and second recording areas, may be characterized in that first data recorded in the first recording area is unencrypted data and at least a part of second data recorded in the second recording area is encrypted data, and compression rates of the first data and second data are made different from each other.

The discoid recording medium whose disk dimensions, track pitch, and minimum pit length are respectively specified in accordance with a standard, may comprise:

a first recording area allowing data for the specified maximum regeneration time to be recorded by storing first data in accordance with the lower limit of an allowable width of the track pitch and the lower limit of an allowable width of the minimum pit length;

a second recording area allowing second data to be recorded; characterized in that the first data and second data are discontinuously recorded.

A data recording method for recording data in a recording medium where recording area is divided into at least first and second recording areas, may comprise the steps of:

recording first data which is unencrypted data in a first recording area and recording second data at least a part of which is encrypted in a second recording area; and making compression rates of the first and second data different from each other.

A data recording apparatus for recording data in a recording medium whose recording area is divided into at least first and second recording areas, may comprise:

recording means for recording first data which is unencrypted data in a first recording area and recording second data at least a part of which is encrypted in a second recording area; characterized in that compression rates of the first data and second data are made different from each other.

A data recording method for recording data in a recording medium, whose disk dimensions, track pitch, and minimum pit length are respectively specified in accordance with a standard, may comprise the steps of:

recording data for the specified maximum regeneration time in a first recording area by storing first data in accordance with the lower limit of an allowable width of the track pitch and the lower limit of an allowable width of the minimum pit length; and recording second data in a second recording area discontinuously from the first data.

A data recording apparatus for recording data in a recording medium whose disk dimensions, track pitch, and minimum pit length are respectively specified in accordance with a standard, may be characterized in that data for the specified maximum regeneration time is recorded in a first recording area by storing first data in accordance with the lower limit of an allowable width of the track pitch and the lower limit of an allowable width of the minimum pit length, and second data is recorded in a second recording area discontinuously from the first data.

A data reproducing method for reproducing data from a data-recording medium in which a recording area is divided into at least first and second recording areas, first data recorded in the first recording area is unencrypted data, at least a part of second data recorded in the second recording area is encrypted data, compression rates of the first data and second data are made different from each other, and management information indicating whether the second encrypted data is recorded, may comprise the steps of:

reproducing data from a data-recording medium;

determining whether the second encrypted data is recorded in accordance with reproduced management information; and decoding the second encrypted data when it is determined that the second data is recorded.

A data reproducing apparatus for reproducing data from a data-recording medium in which a recording area is divided into at least first and second recording areas, first data recorded in the first recording area is unencrypted data, at least a part of second data recorded in the second recording area is encrypted data, compression rates of the first data and second data are made different from each other, and management information indicating whether the second encrypted data is recorded, may comprise:

reproducing means for reproducing data from the data-recording medium;

first signal processing means for processing first data; and second signal processing means for processing second data; characterized in that it is determined in accordance with reproduced information whether the second encrypted data is recorded and the second encrypted data is decoded by the second signal processing means when it is determined that the second data is recorded.

A data reproducing method for reproducing data from a discoid recording medium whose disk dimensions, track pitch, and minimum pit length are respectively specified in accordance with a standard, which is constituted of a first recording area allowing data for the specified maximum regeneration time to be recorded by storing first data in accordance with the lower limit of an allowable width of the track pitch and the lower limit of an allowable width of the minimum pit length and a second recording area allowing second data to be recorded, and in which the first data and the second data are discontinuously recorded and the management information for designating whether the second data is stored is recorded, may comprise the steps of:

reproducing data from the discoid recording medium;

determining whether second encrypted data is recorded; and decoding the second encrypted data when it is determined that the second data is recorded.

A data reproducing apparatus for reproducing data from a discoid recording medium whose disk dimensions, track pitch, and minimum pit length are respectively specified in accordance with a standard, which is constituted of a first recording area allowing data for the specified maximum regeneration time to be recorded by storing first data in accordance with the lower limit of an allowable width of the track pitch and the lower limit of an allowable width of the minimum pit length and a second recording area allowing second data to be recorded, and in which the first data and the second data are discontinuously recorded and the management information for designating whether the second data is stored is recorded, may comprise:

reproducing means for reproducing data from a data-recording medium;

first signal processing means for processing the first data;

second signal processing means for processing the second data; characterized in that it is determined in accordance with reproduced management information whether second encrypted data is recorded and the second encrypted data is decoded by the second signal processing means when it is determined that the second data is recorded.

A discoid recording medium may comprise at least:

a first lead-in area;

a first recording area formed at the circumferential side of the first recording area and allowing uncompressed data to be recorded;

a first lead-out area formed at the circumferential side of the first recording area;

a second lead-in area formed at the circumferential side of the first lead-out area;

a second recording area formed at the circumferential side of the second lead-in area and allowing compressed data to be recorded; and a second lead-out area formed at the circumferential side of the second recording area.

A reproducing apparatus of a discoid recording medium may comprise at least:

a first lead-in area, a first recording area formed at the circumferential side of the first lead-in area and allowing uncompressed data to be recorded, and a first lead-out area formed at the circumferential side of the first recording area; and a second lead-in area formed at the circumferential side of the first lead-out area, a second recording area formed at the circumferential side of the second lead-in area and allowing compressed data to be recorded, and a second lead-out area formed at the circumferential side of the second recording area, characterized in that the first lead-in area is provided with;

a head for reading data and collateral information from the discoid recording medium in which collateral information including identification information showing whether the second recording area is present and start and end addresses of the first and second recording areas are recorded, a first reproducing section to which an output signal is supplied from the head to reproduce the uncompressed data read from the first recording area of the recording medium, a second reproducing section to which an output signal is supplied from the head to reproducing the compressed data read from the second recording area of the recording medium; and a control section for changing the first reproducing section and the second reproducing section in accordance with the collateral information read by the head.

A reproducing method of a discoid recording medium provided with at least a first lead-in area, a first recording area formed at the circumferential side of the first lead-in area and allowing uncompressed data to be recorded, and a first lead-out area formed at the circumferential side of the first recording area, and a second lead-in area formed at the circumferential side of the first lead-out area, a second recording area formed at the circumferential side of the second lead-in area to store compressed data, and a second lead-out area formed at the circumferential side of the second recording area, characterized in that the first lead-in area is provided with; may comprise the steps of:

reading data and collateral information from the discoid recording medium in which the identification information showing whether the second recording area is present and collateral information including at least start and end addresses of the first and second recording areas are recorded in the first lead-in area by a head; and changing a first reproducing section to which an output signal is supplied from the head and which reproduces the uncompressed data read from the first recording area of the recording medium and a second reproducing section to which an output signal is supplied from the head and which reproduces the compressed data read from the second recording area of the recording medium in accordance with the collateral information read by the head.

A discoid recording medium may comprise:

a first recording area in which the data of a first compression rate in which at least first and second pieces of copyright management information are embedded is recorded; and a second recording area in which the data of a second compression rate different from the first compression rate in which at least second copyright management information is embedded is recorded.

A copy control method of a recording medium may comprise the steps of:

determining whether second copyright management information is detected from the data read from the recording medium provided with a first recording area in which the data of a first compression rate in which at least first and second pieces of copyright management information are embedded is recorded and a second recording area in which the data of a second compression rate different from the first compression rate in which at least second copyright management information is embedded is recorded;

determining whether first copyright management information is detected when the second copyright management information is detected; and performing copy control of the data read from the recording medium in accordance with the first copyright management information when it is determined that the first copyright management information is detected.

BRIEF DESCRIPTION OF DRAWINGS

FIGS. 11A to 11D are schematic diagrams showing data formats of a CD-ROM to which the present invention can be applied;

BEST MODES FOR CARRYING OUT THE INVENTION

Figure 1A:
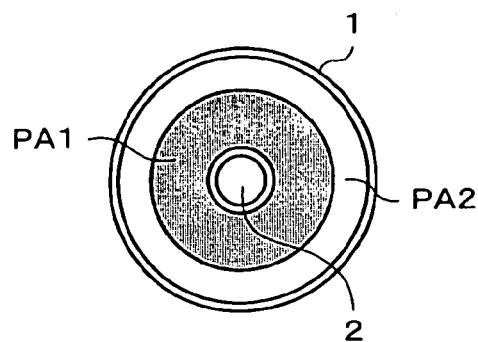
FIGS. 1A and 1B are schematic diagrams for explaining a data-recording medium of the present invention.

The first embodiment of the present invention is described below. FIG. 1A shows a recording medium of the present invention such as a disk 1. The disk 1 is an optical disk in which a recording area is divided into two areas in the radius direction of the disk and a first recording area (referred to as first part) PA1 and a second recording area (referred to as second part) are formed. First content data that is unencrypted data (clear text) such as first audio data is recorded in inner tracks of the disk 1. Second contents data at least a part of which is encrypted such as second audio data is recorded in the second part PA2 at outer tracks of the disk 1. Moreover, a center hole 2 is formed at the central portion of the disk 1.

Figure 1B:
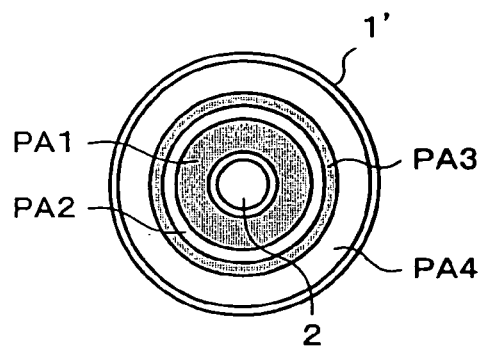

FIG. 1B shows another disk to which the present invention is applied. In the case of a disk 1', a program area is divided into four areas in the radius direction and thereby, recording areas PA1, PA2, PA3, arid PA4 are formed. First unencrypted data and third unencrypted data are recorded in the recording areas PA1 and PA3 and second encrypted data and fourth encrypted data are recorded in the recording areas PA2 and PA 4. Though not illustrated, the number of recording areas to be formed in the radius direction of the disk 1 is not restricted to 4 but it is possible to select an optional number of recording areas.

Figure 2:
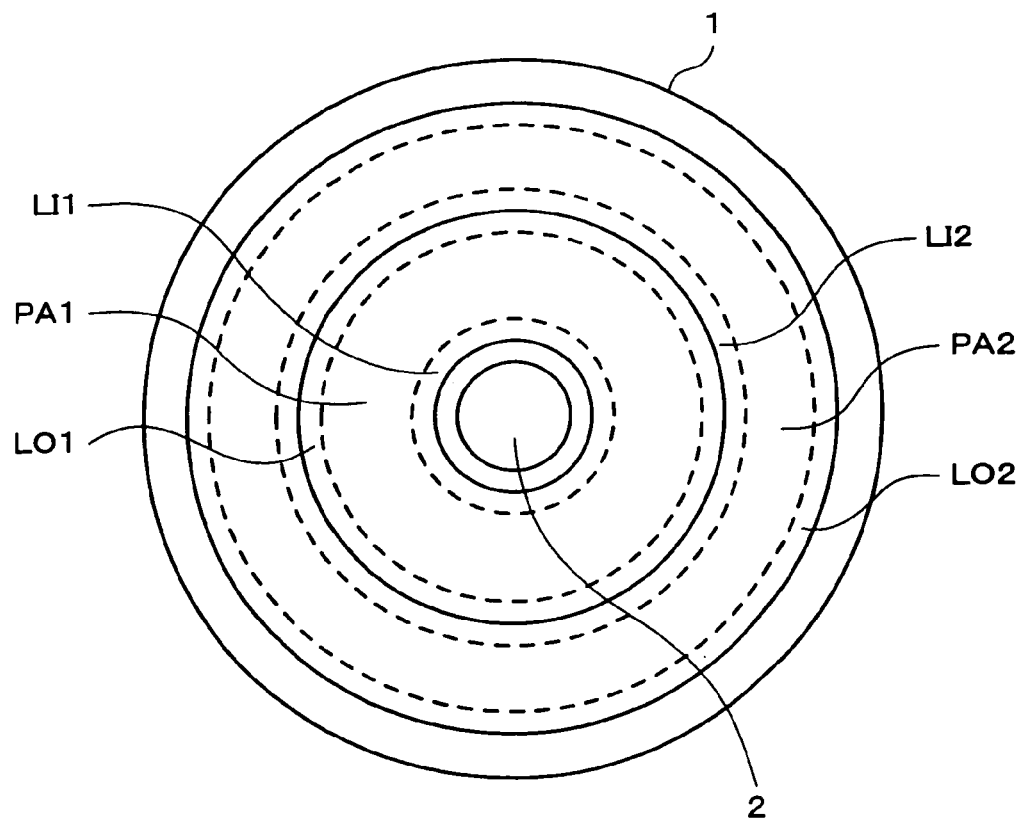
FIG. 2 is a schematic diagram for explaining an area of a disk of first embodiment of the present invention.

As shown in FIG. 1A, the disk 1 having two recording areas is more minutely described below. The optical disk 1 shown in FIG. 1A is designed by considering the compatibility with a CD. FIG. 2 shows areas of the disk 1. A lead-in area LI1 is formed at the circumference of a clamping area at the innermost side of the disk 1 and the first part PA1 is formed outside of the lead-in area LI1 as a program area and a lead-out area LO1 is formed outside of the first part PA1. A lead-in area LI2 is formed outside of the lead-out area LO1, the second part PA2 is formed outside of the lead-in area LO2 as a program area, and a lead-out area LO2 is formed outside of the second part. A mirror area is formed between the outside of the lead-out area LO1 and the lead-in area LI2 and linear velocities of the first part PA1 and second part PA2 are changed at the mirror section, as described later.

Figure 3:
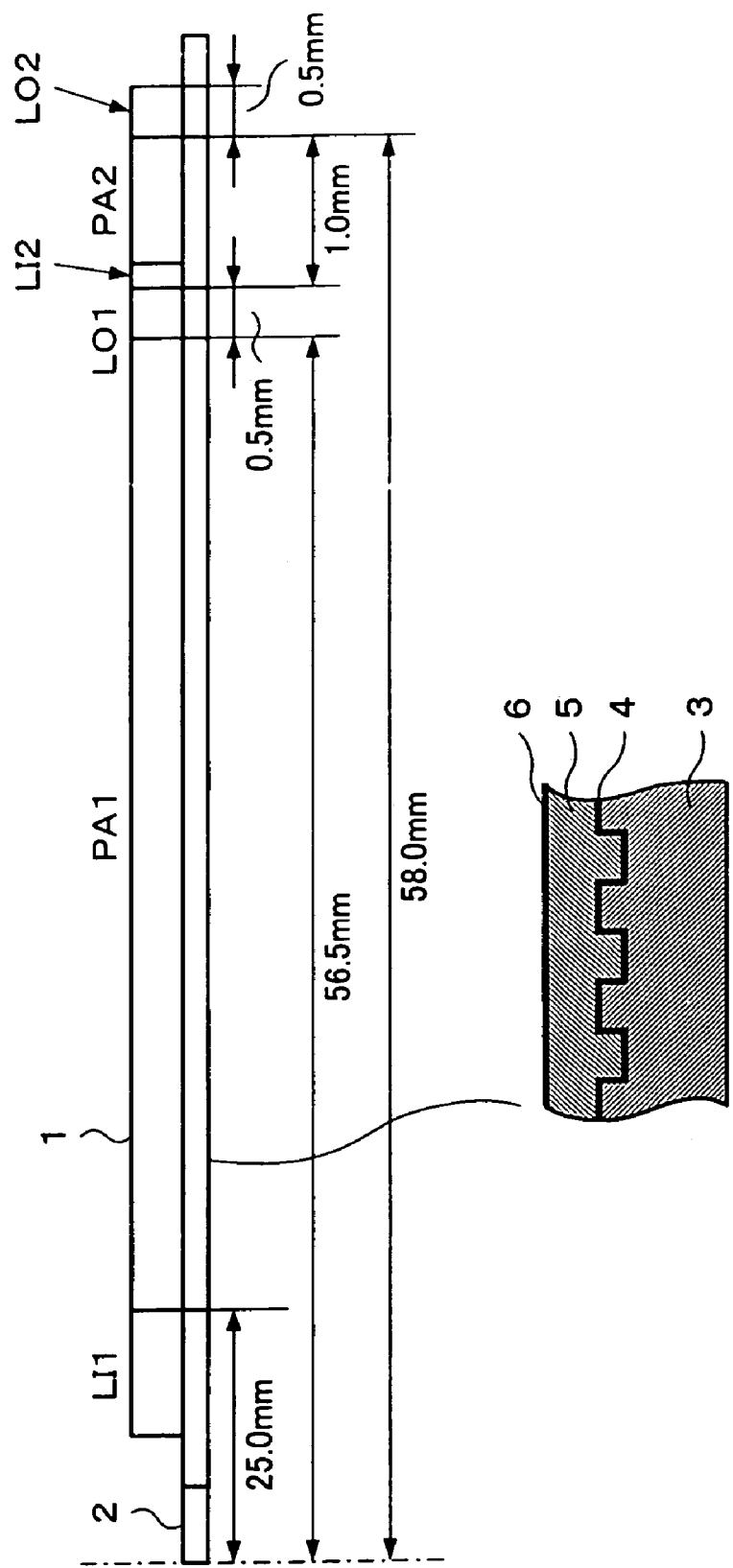
FIG. 3 is a schematic diagram for explaining dimensions of a disk in the first embodiment of the present invention.

FIG. 3 shows dimensions of the disk 1 which are the same as physical dimensions of a CD. The alternate long and short dash line in FIG. 3 shows the central position of the disk 1. As shown in FIG. 3 by enlarging a part of the disk 1, the thickness of the disk 1 is equal to 1.2 mm. The disk 1 has a structure in which a reflective layer 4 (40 to 80 nm) formed by sputtering aluminum or the like, a protective layer (10 to 200 μm) made of an ultraviolet-curing resin formed to protect the reflective layer 4, and a label layer 6 formed on the protective layer 5 through printing are layered on a polycarbonate substrate 3. Pits (irregularity) corresponding to data are formed on one side of the substrate 3 and presence of absence of pits is read as the light-quantity difference between reflected laser beams by applying a laser beam from other side of the substrate 3 and detecting laser beams reflected from the reflective layer 4.

The range from the position 23 mm separate from the center of the disk 1 up to the position 25 mm separate from the center of it is assumed as the lead-in area LI1. In the case of an existing CD, a program area is formed outside of a lead-in area in a range from the center of a disk up to a position 58 mm separate from the center and a lead-out area is formed outside of the program area in a range from the center of the disk up to a position 58.5 mm separate from the center.

The standard (referred to as Red Book) of existing CDs specifies that track pitch is kept at 1.6±0.1 μm and a linear velocity at CLV (Constant Linear Velocity: constant) ranges between 1.2 and 1.4 m/sec. When record data uses a predetermined format, the minimum pit length on a CD is decided by a linear velocity. When a linear velocity is equal to 1.25 m/sec, the minimum time width (time width when the number of 0s between 1s of a record signal is minimum) Tim according to the EFM (Eight-to-Fourteen Modulation) mode is equal to 3T and the pit length corresponding to 3T becomes 0.87 μm. The pit length corresponding to T is the minimum, pit length. The maximum regeneration time (74.4 min) of a CD is achieved at (a track pitch of 1.6 μm and a linear velocity of 1.2 m/sec).

A digital audio signal is recorded in the first part PA1 of the disk 1 in accordance with the signal format same as the case of an existing CD. Audio data is recorded in the first part PA1 at the lower limit (1.5 μm) of an allowable value of a track pitch according to the standard of CDs and the lower limit (1.2 m/sec) of linear velocity. As a result, it is possible to record digital audio data for the maximum regeneration time (74.7 min) according to an existing CD format in a range from the center of the disk 1 up to a position 56.5 mm separate from the center (that is, first part PA1). It is assumed that the range of 0.5 mm outside of the first part PA1 in the radius direction is the lead-out area LO1.

The lead-in area LI1, first part PA1, and lead-out area LO1 thus formed meet existing CD standards. Therefore, an existing CD reproducing apparatus can smoothly reproduce the audio data recorded in the first part PA1 similarly to the case of an existing CD.

Moreover, in the range from the center of the disk 1 up to a position 58 mm separate from the center, a range of 1 mm is left as a recording area in the radius direction outside of the lead-out area LO1. The lead-in area LI2 and second part PA2 are formed in the recording area of the range of 1 mm. The lead-out area LO2 is formed in the range of 0.5 mm outside of the second part PA2. After all, the dimension up to the lead-out area LO2 on the disk 1 in the radius direction becomes 58.5 mm which meets the specified dimension of an existing DC. The dimension from the center of the disk 1 up to the outermost side of a substrate is equal to 60 mm (120 mm in terms of diameter).

Roughly, audio data such as a linear PCM signal of uncompressed data is recorded in the first part PA1 in accordance with the same format as an existing CD and compressed and encrypted audio data is recorded in the second part PA2 at single density or double density. The single density denotes the recording density same as the case of an existing CD and the double density denotes a density two times larger than the single density. The audio data recorded in the second part PA2 is charged when audio data is reproduced in order to protect a copyright. Data is recorded in the second part PA2 in accordance with the format of a CD-ROM, that is, the format of CD-ROM mode 2 form 1.

The data quantity that can be recorded in the disk 1 having the above dimensions is described below. When assuming the maximum allowable capacity of the first part PA1 as 74.4 min and that of the lead-out area LO1 as 90 sec, it is possible to set the maximum allowable capacity of the second part PA2 to 35 min (linear velocity of 1.2 m/sec and track pitch of 1.5 μm) at single density and set the maximum allowable capacity of the second part PA2 to 74.7 to 80 min (linear velocity of 0.87 m/sec and track pitch of 1.1 μm) through compression. That is, it is possible to record the audio data for the time equal to the time of the data of the first part PA1 in the second part PA2 at double density.

Figure 4:
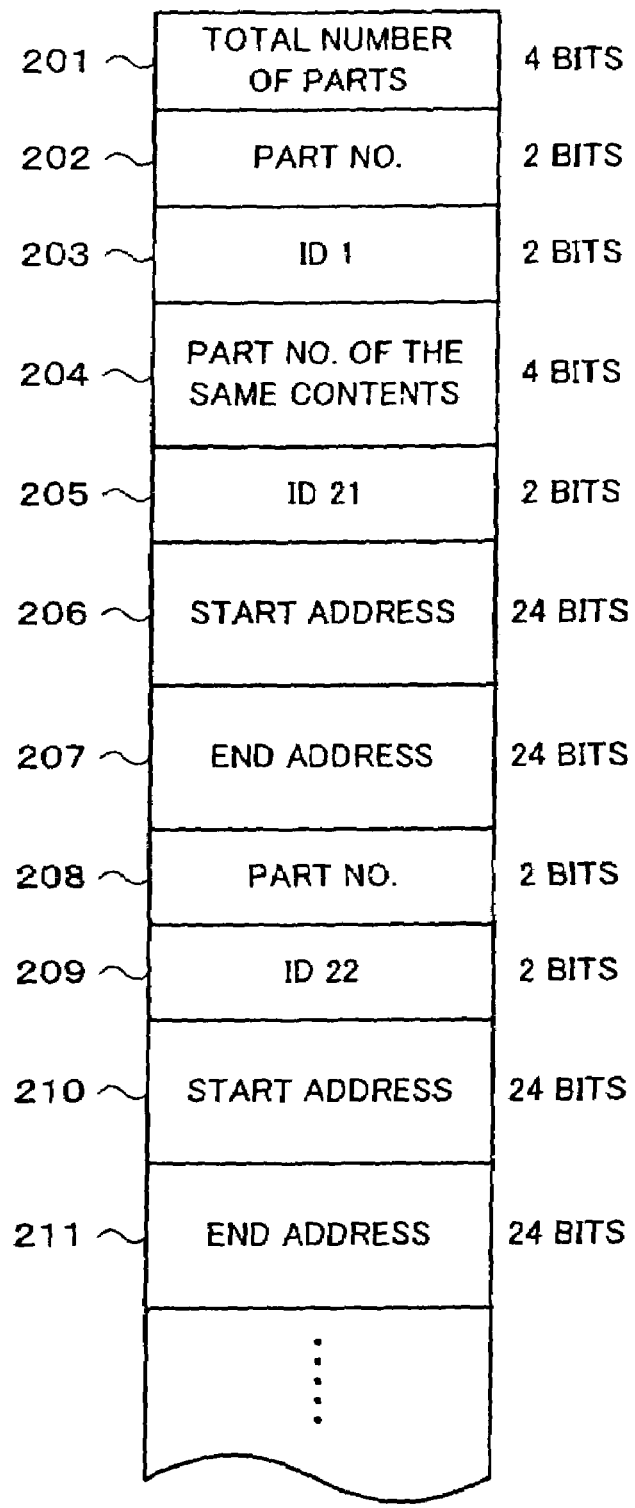
FIG. 4 is a schematic diagram showing a data format of collateral information in the first embodiment of the present invention.
Figure 5:
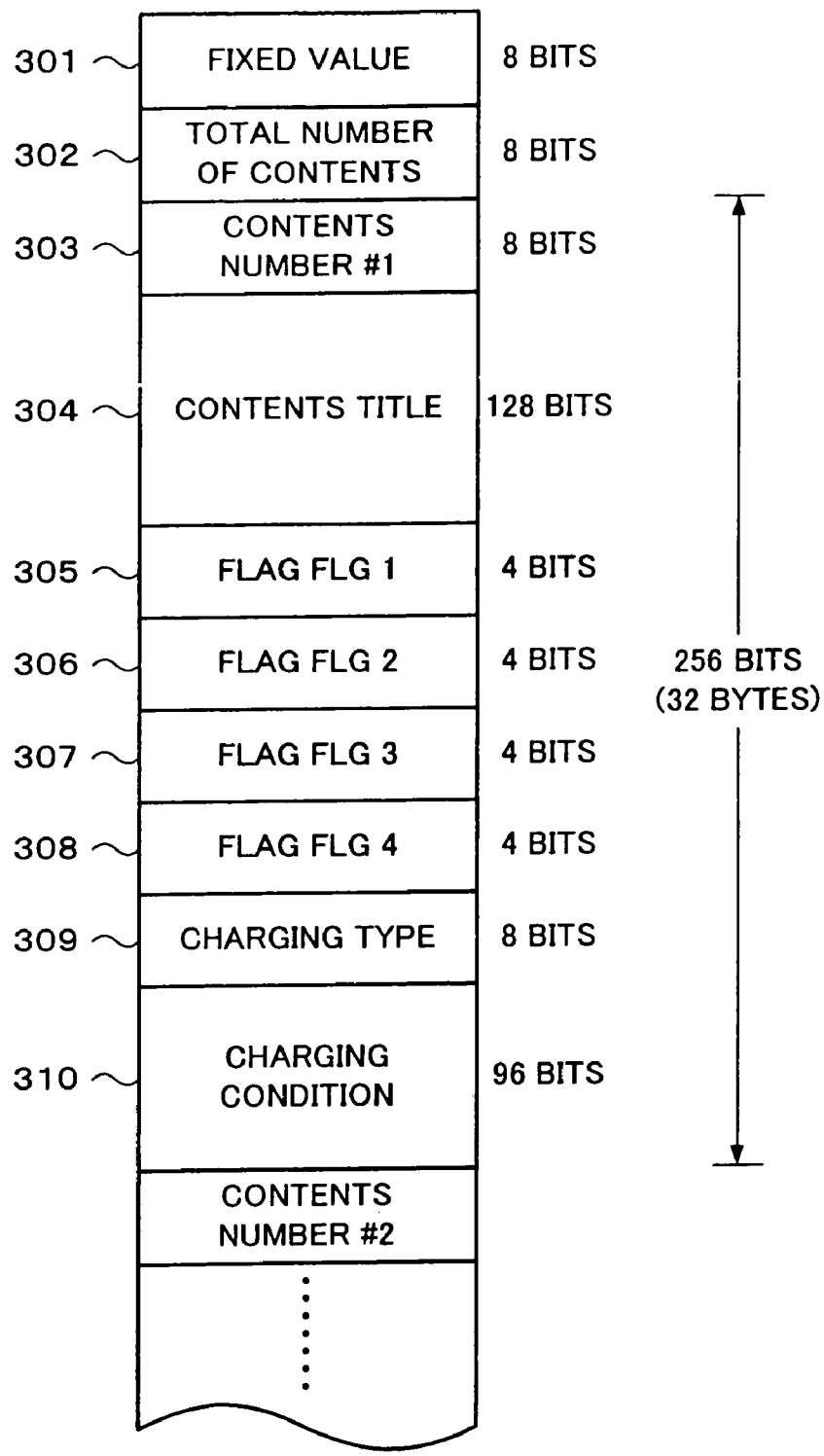
FIG. 5 is a schematic diagram showing a data format of collateral information in the first embodiment of the present invention.

In the case of the disk 1 in which audio data to be charged under regeneration is recorded in the second part PA2 while keeping the compatibility with the above existing CD, the data same as existing TOC (Table Of Contents) is recorded in the lead-in area LI1 to be first reproduced when setting the disk 1 to a reproducing apparatus and moreover, collateral pieces of information shown in FIGS. 4 and 5 are recorded. The collateral information is encrypted according to necessity.

The collateral information shown in FIG. 4 is used to describe identification of presence of a plurality of parts and the information about parts. The information 201 (4 bits) about the total number of parts of the disk 1 is set (recorded) at the head. In the case of the example shown in FIGS. 2 and 3, the number of parts is equal to 2. Then, information 202 about part numbers is set. Normally, a part number starts with 1 and changed to 2, 3, . . . in the ascending order.

Then, 2-bit ID1 (identification information) 203 is set after the part numbers. The ID1 shows whether contents same as the contents of part 1 are present in other part. Then, a part number in which the contents same as that of the part 1 are recorded is recorded in accordance with 4-bit data 204. If the same contents are not recorded, data values 204 are all set to 0.

The next 2-bit ID21 (205) denotes encrypted identification information about the part 1. That is, the ID21 (205) shows whether the part 1 is encrypted and the type of encryption. For example, "ID21=00" denotes unencrypted data, "ID21=01" denotes encryption by DES (Data Encryption Standard), "ID21=10" denotes encryption by RSA, and "ID21=11" denotes undefinedness.

A start address 206 (24 bits) showing the recording start position of the first part PA1 and an end address 207 (24 bits) showing the recording end position of the first part PA1 are arranged after the ID21 (205). A notation of addresses such as the start address 206 and end address 207 uses M (min), S (second), and F (frame) by BCD similarly to the case of an existing CD. It is permitted to use binary notation other than M, S, and F for the notation of the end address 207 or the like in the case of data other than a CD format.

A part number 208 of the next part (second part) is set after the end address 207 of the first part PA1. Thereafter, ID22 (209) serving as encrypted identification information about the second part AP2 and the start address 210 (24 bits) of the second part, and the end address 211 (24 bits) of the second part are arranged. Hereafter, when there are three parts or more, the part number of each part, encrypted identification information, a start address, and an end address are arranged in order. An address showing the recording position of each part shows the head position of the program area of each part or the head position of the lead-in area of each part.

FIG. 5 shows a data configuration of the collateral information about charging recorded in the lead-in area LI1. A fixed value (fixed code) 301 is located at the head of the collateral information. The fixed value 301 is a one-byte (8 bits) fixed code such as "11110000". The fixed value 301 shows that the following data is collateral information. Data values following the fixed value 301 are described below in order.

The total number of 8-bit contents 302 shows the total number of contents in the disk 1. Therefore, a contents number 303 (8 bits) are arranged (recorded). The contents number 303 shows the sequence in the total number and the first contents #1 are first arranged. The unit of 256 bits starting with the contents number 303 shows the collateral information about #1.

The tile 304 (128 bits) of the contents with the contents number 303 is set after the contents number 303. The title 304 is used to describe a title name and an ISRC (International Standard Recording Code)(copyright code). A language and a code for describing the title name are previously specified. Four-bit flags FLG1 (305), FLG2 (306), FLG3 (307), and FLG4 (308) are arranged after the contents title 304.

The flag FLG1 (305) shows presence or absence of a copyright. In the case of contents having no copyright, FLG1 is set to 0000. An example having no copyright is the contents whose copyright is nullified. The flag FLG2 (306) shows presence or absence of encryption. In the case of contents that are not encrypted, FLG2 is set to 0000. In general, contents having no copyright are not encrypted. The flag FLG3 (307) shows whether contents are contents for promotion. In the case of the contents for promotion, FLG3 is set to 0000. The flag FLG4 (308) shows whether contents are personal original contents. In the case of personal original contents, FLG4 is set to 0000.

The information about charging is set after the above flags FLG1 to FLG4. To determine whether contents are contents to be charged, it is known that the contents not to be charged if the contents have one (0000) of the flags FLG1 to FLG4. The information about charging is constituted of an 8-bit charging type 309 and a 96-bit charging condition 310. The charging type 309 is the information for distinguishing between purchase type, cross type, and frequency type. The charging condition 310 is data showing the information of a charging condition for each charging type.

For example, when the charging type 309 is the purchase type, the data recorded in the second part PA2, that is, the data for a purchase price of contents data is set (or recorded) as the charging condition 310. When the charging type 309 restricts the cross-type regeneration frequency, the data of the regeneration frequency of the above contents data is set as the charging condition 310. When the charging type 309 restricts the cross-type regeneration period, the data for the regeneration period (one day, one week, or one month) of the above contents data is set as the charging condition 310. When the charging type 309 is the frequency type, the data for frequency (1-yen for two minutes, 1-yen per min, 1-yen for 30 sec, . . . ) is set as the charging condition 310. Moreover, even in the case of contents data to be charged, it is possible to set a condition when the contents can be looked and listened as the charging condition 310.

The information about the next contents (contents number #2) is set after the information (256 bits) about the above contents number #1. The configuration of the information about the contents number #2 has the same data arrangement as the case of the information about the above contents number #1. Subsequently, the information about all contents in the disk 1 is recorded.

It is also permitted to record some of the collateral information shown in FIGS. 4 and 5 also in the lead-in area LI2 of the second part PA2. Moreover, it is permitted to raise the resistance of collateral information against errors by repeatedly recording the collateral information in the lead-in area LI1.

Figure 6:
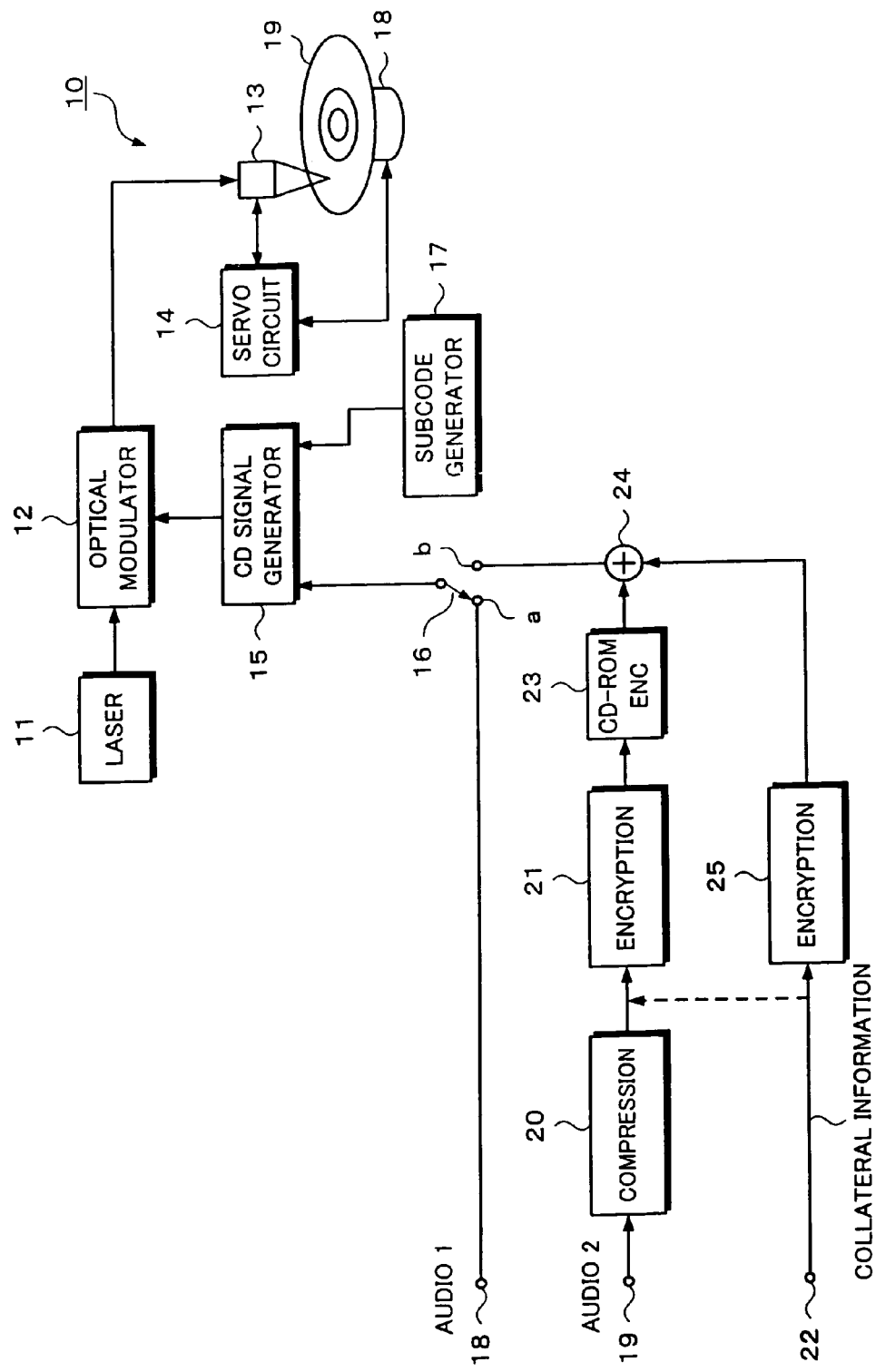
FIG. 6 is a block diagram showing a configuration of a mastering apparatus that is the first embodiment of the present invention.

A recording apparatus of the disk 1, that is, a mastering apparatus 10 is described below by referring to FIG. 6. As shown in FIG. 6, the mastering apparatus 10 is provided with a light source 11 which is a gas laser such as Ar-ion laser, He—Cd laser, or Kr-ion laser, an acoustooptic-effect optical modulator 12 for modulating (turning on/off) a laser beam emitted from the light source 11 in accordance with a signal output from a CD signal generator 15, and an optical pickup having an objective lens or the like for condensing a laser beam passing through the optical modulator 12 and applying the laser beam to the photoresist surface of a discoid glass master 19 to which photoresist serving as a photosensitive material is applied.

A servo circuit 14 is provided which controls the optical pickup 13 so as to keep the distance from the glass master 19 constant and controls the rotation driving operation of a spindle motor 18. Data is recorded at a track pitch of 1.5 μm by a laser beam emitted from the optical pickup 13 and the glass master 19 is rotated so that it has a linear velocity of 1.2 m/sec. The CD signal generator 15 generates a record signal according to the CD standard recorded in the glass master 19 in accordance with main data passing through a selector 16 and a subcode supplied from a subcode generator 17 and the optical modulator 12 is turned on/off in accordance with the record signal. The glass master 19 is rotated so that it has the above linear velocity by the spindle motor 18. The spindle motor 18 is rotated so that it has a linear velocity of 1.2 m/sec when cutting the area of the first part PA1 of the disk 1 and rotated so that it has a linear velocity of 0.87 m/sec when cutting the area of the second part PA2. In this case, feed rates of the optical pickup 13 are changed so that the track pitch becomes 1.1 μm. The motor 18 is changed by a not-illustrated controller in accordance with an output sent from a not-illustrated position detector for detecting the position of the optical pickup 13.

The mastering apparatus 10 modulates a laser beam emitted from the light source 11 in accordance with a record signal generated by the CD signal generator 15. The mastering apparatus 10 produces a master in which the data according to the CD standard is recorded by applying the modulated laser beam to the photoresist surface of the glass master 19.

The CD signal generator 15 converts the main data passing through the selector 16 and a subcode supplied from the subcode generator 17 to the data based on the CD standard. That is, 16 bits of one sample or one word is divided into high-order 8 bits and low-order 8 bits and respectively used as a symbol, error correction encoding or scrambling for adding error-correction parity data by a CIRC (Cross Interleave Reed-Solomon Code) is applied to the data in these symbols and moreover, modulated in accordance with the EFM (Eight-to-Fourteen Modulation) mode.

The selector 16 changes the data recorded in the first part PA1 and the data recorded in the second part PA2. To record data in the first part PA1, the selector 16 selects an input terminal a so as to select linear audio from an input terminal 18. To record data in the second part PA2, the selector 16 selects an input terminal b so as to select the data sent from an adder 24. Though not illustrated, the selector 16 is controlled by a controller for controlling the whole of the mastering apparatus 10.

Audio data recorded in the second part PA2 is supplied to an input terminal 19. The audio data is supplied to an compression-encoding encoder 20 and compression-encoded. For compression encoding, it is possible to use AAC (Advanced Audio Coding) of MPEG2 (Moving Picture Experts Group Phase 2), MP3 (MPEG1 Audio Layer III), ATRAC (Adaptive Transform Acoustic Coding), or ATRAC3. The ATRAC3 realizes a higher compression rate (approx. 1/11) by improving the ATRAC used for the above-described MD. When a plurality of types of compression encoding can be performed, it is permitted to record the information showing types of compression encoding in the collateral information shown in FIGS. 4 and 5.

Output data of the compression-encoding encoder 20 is supplied to an encryption circuit 21. The encryption circuit 21 performs encryption according to DES or RSA. Output data of the encryption circuit 21 is supplied to a CD-ROM encoder 23. The CD-ROM encoder 23 converts a data format recorded in the second part PA2 to the data format of a CD-ROM.

Output data of the CD-ROM encoder 23 is supplied to an adder 24. Outputs of an encryption circuit 25 are supplied to the adder 24. Collateral information sent from the input terminal 22 is supplied to the encryption circuit 25. As explained with reference to FIGS. 4 and 5, the collateral information includes the information about parts and the information about charging and is different from a subcode of an existing CD generated by the subcode generator 17. The encryption circuit 25 encrypts collateral information. It is also permitted to input the collateral information to the encryption circuit 21 through the path shown by a broken line to perform encryption common to audio data input from the input terminal 19. By developing the glass master 19 in which data is recorded by the above mastering apparatus 10 and electrocasting the master 19, a metal master is produced and then, a mother disk is produced from the metal master, and then a stamper is produced from the mother disk. The substrate 3 of the disk 1 is manufactured by using the stamper and a transparent synthetic resin in accordance with a method such as compression molding or injection molding. A reflective layer 4 and a protective layer 5 are formed on the face to which the irregularity of the stamper of the substrate 3 of the disk 1 and a label 6 is provided on the protective layer 5, and thereby the disk 1 is completed.

Figure 7:
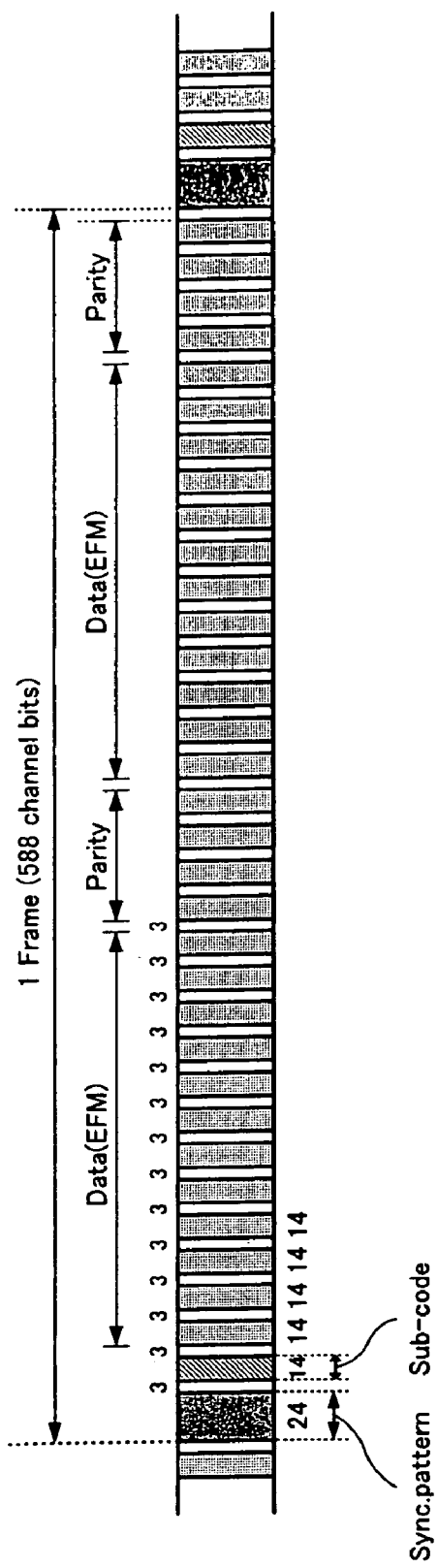
FIG. 7 is a schematic diagram showing a format of a frame in the first embodiment of the present invention.

Signals recorded in parts are described below. FIG. 7 shows the data configuration of one frame of a CD signal. The data recorded in the first part PA1 is based on the CD standard. In the case of a CD, a parity Q and a parity. P of four symbols are respectively formed from the total of 12 samples (24 symbols) of the digital audio data of 2 channels. Thirty-three symbols (264 data bits) obtained by adding one symbol of a subcode to the total of 32 symbols are handles as one group. That is, one frame after modulated includes 33 symbols comprising a subcode, data of 24 symbols, Q parity of 4 symbols, and P parity of 4 symbols.

In the case of EFM modulation, each symbol (8 data bits) is converted to 14 channel bits. Three connection bits are arranged between 14 channel bits. Moreover, a frame sync pattern is added to the head of a frame. The frame sync pattern is a pattern in which 11T, 11T, and 2T continue when assuming the cycle of a channel bit as T. Because the above pattern does not occur when conforming to the EFM modulation rule, frame sync can be detected by a unique pattern. One frame comprises the total of 588 channel bits.

A group of 98 frames same as the above frame is referred to as a subcode frame. A subcode frame obtained by rearranging the 98 frames so as to continue in the longitudinal direction comprises a frame synch part for identifying the head of the subcode frame, a subcode part, and a data-and-parity part. The subcode frame corresponds to 1/75 sec of the normal CD regeneration time.

A subcode generated by the above subcode generator 17 is recorded in the subcode part. The subcode part is constituted of 98 frames. The first two frames in the subcode part respectively serve as a subcode-frame sync pattern and also an EFM out-of-rule pattern. Bits in the subcode part constitute P, Q, R, S, T, U, and W channels.

The R channel or W channel is used for a special purpose such as a static image or character indication of karaoke. The P channel and Q channel are used for the track-position control operation of an optical pickup under regeneration of the digital data recorded in a disk.

The P channel is used only to record a signal set to "0" in the so-called lead-in area located at an inner track of a disk and a signal to be repeatedly set to "0" and "1" at a predetermined cycle in the so-called lead-out area located at an outer track of the disk. Moreover, the P channel is used only to record a signal set to "1" at a portion between melodies and to "0" at a portion other than the above portion in a program area located between lead-in and lead-out areas of a disk. This P channel is provided to search the head of each melody under regeneration of the digital audio data recorded in a CD.

Figure 8:
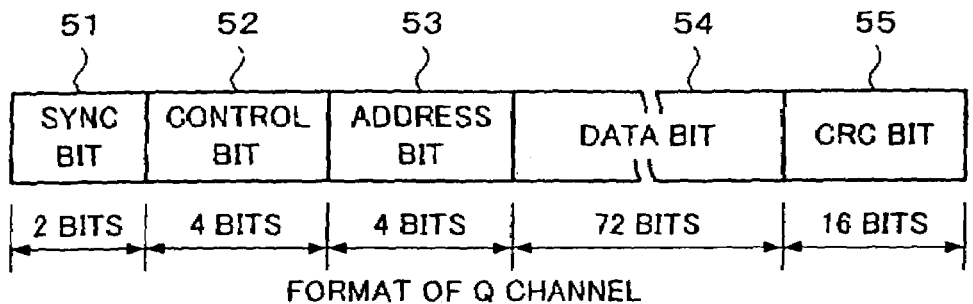
FIG. 8 is a schematic diagram showing a format of a Q channel in the first embodiment of the present invention.

The Q channel is provided to realize more-minute control under regeneration of the digital audio data recorded in a CD. As shown in FIG. 8, one subcode frame of the Q" channel is constituted of a sync bit part 51, a control bit part 52, an address bit part 53, a data bit part 54, and a CRC bit part 55.

The sync bit part 51 comprises two-bit data, in which a part of the above sync pattern is recorded. The control bit part 52 comprises four-bit data, in which the data for identifying the number of audio channels, emphasis, and digital data. The four-bit data denotes two-channel audio with no pre-emphasis when the data is set to "0000", denotes four-channel audio with no pre-emphasis when the data is set to "1000", denotes two-channel audio with pre-emphasis when the data is set to "0001", and denotes four-channel audio with pre-emphasis when the data is set to "1001". The four-bit data denotes a data track not audio when the data is set to "0100". The address bit part 53 comprises four-bit data, in which control signals showing the format of and the type of the data in the data bit part 54 to be mentioned later are recorded. The CRC bit part 55 comprises 16-bit data, in which the data for detecting an error of a cyclic code (Cyclic Redundancy Check Code) is recorded.

Figure 9:
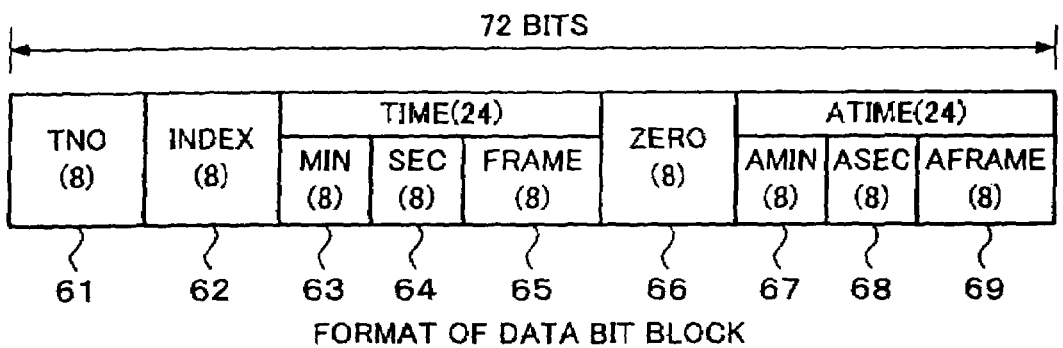
FIG. 9 is a schematic diagram showing a format of a data bit block in the first embodiment of the present invention.

The data bit part 54 comprises 72-bit data. As shown in FIG. 9, when the four-bit data of the address bit part 53 is set to "0001", the data bit part 54 is constituted of a track number part (TNO) 61, an index part (INDEX) 62, an elapsed-time minute component part (MIN) 63, an elapsed-time second component part (SEC) 64, an elapsed-time frame number part (FRAME) 65, a zero part (zero) 66, an absolute-time component part (AMIN) 67, an absolute-time second component part (ASEC) 68, and an absolute-time frame number part (AFRAME) 69. These parts respectively comprise 8-bit data.

The track number part (TNO) 61 is shown in accordance with two-digit binary coded decimal (BCD). The track number part (TNO) 61 shows the number for a lead-in track serving as a track for starting reading of data at "00" and shows a track number corresponding to the number for each melody or movement at "01" or "99". The track number part (TNO) 61 shows the number for a lead-out track serving as a track for ending reading of data at "AA" of hexadecimal notation.

The index part (INDEX) 62 is shown in accordance with two-digit BCD, which shows temporary stop, that is, the so-called pause at "00" and shows a track of each melody or movement further fractionated at "01" or "99".

The elapsed-time minute component part (MIN) 63, elapsed-time second component part (SEC) 64, and elapsed-time frame number part (FRAME) 65 are respectively shown in accordance with two-digit BCD, which respectively show an elapsed time in each melody or movement at the total of 6 digits. In the case of the zero part (ZERO) 66, "0" is provided to all of 8 bits.

The absolute-time component part (AMIN) 67, absolute-time second component part (ASEC) 68, and absolute-time frame number part (AFRAME) 69 are respectively shown in accordance with two-digit BCD, which respectively show the elapsed time (ATIME) since the first melody at the total of 6 digits.

Figure 10:
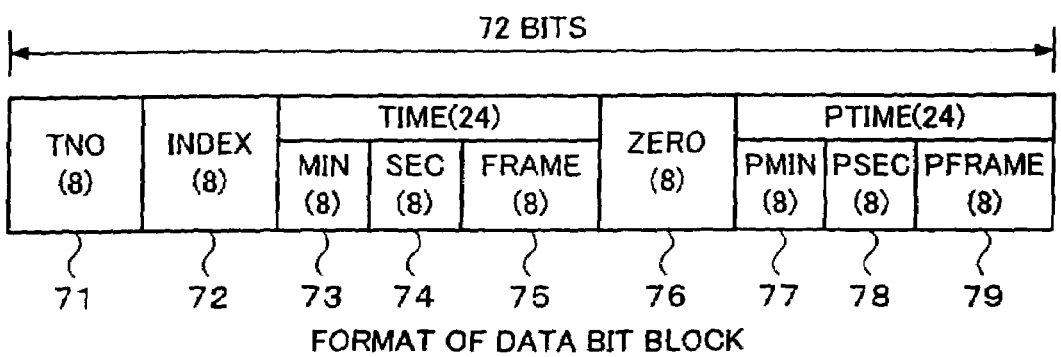
FIG. 10 is a schematic diagram showing a format of a data bit block of a TOC in the first embodiment of the present invention.

As shown in FIG. 10, the data bit part 54 in a TOC (Table of Contents) in the lead-in area of a disk is constituted of a track number part (TNO) 71, a point part (POINT) 72, an elapsed-time minute component part (MIN) 73, an elapsed-time second component part (SEC) 74, an elapsed-time frame number part (FRAME) 75, a zero part (ZERO) 76, an absolute-time minute component part (PMIN) 77, an absolute-time second component part (PSEC) 78, and an absolute-time frame number part (PFRAME) 79, and these parts respectively comprise 8-bit data.

The track number part (TNO) 71, elapsed-time minute component part (MIN) 73, elapsed-time second component part (SEC) 74, and elapsed-time frame number part (FRAME) 75 are all fixed to "00" of hexadecimal notation. In the case of the zero part (ZERO) 76, "0" is provided to all of 8 bits similarly to the case of the above zero part (ZERO) 66.

The absolute-time minute component part (PMIN) 77 shows the first melody number or movement when the point part (POINT) 72 is set to "A0" of hexadecimal notation and shows the first melody number or movement number when the point part (POINT) 72 is set to "A1" of hexadecimal notation. When the point part (POINT) 72 is set to "A2" of hexadecimal notation, the absolute-time minute component part (PMIN) 77, absolute-time second component part (PSEC) 78, and absolute-time frame number part (PFRAME) 79 respectively show an absolute time (PTIME) at which a lead-out area begins. When the point part (POINT) 72 is shown in accordance with two-digit BCD, the absolute-time minute component (PMIN) 77, absolute-time second component part (PSEC) 78, and absolute-time frame number part (PFRAME) 79 respectively serve as an address starting with each melody or movement shown by the value of each part in terms of an absolute time (PTIME).

Thus, the Q channel stores time information in which the program area and lead-in area of the disk 1 are respectively shown by 24 bits though the both areas are slightly different from each other in format.

Then, a CD-ROM data format (specified in accordance with the standard referred to as Yellow Book) applied to the data to be recorded in the second part PA2 is described below. In the case of a CD-ROM, 2,352 bytes that are the data included in 98 frames of one cycle of a subcode are used as access unit. The access unit is also referred to as block or sector. The length of each of the above frames is equal to 1/75 sec that is equal to that of the CD subcode frame described above. The CD-ROM has mode 0, mode 1, mode 2 (form 1), and mode 2 (form 2) and the data format of the CD-ROM slightly differs in modes as shown in FIGS. 11A to 11D.

That is, the data format in the mode 0 is formed by a data part of 2,336 bytes which are all set to "0" though not illustrated. The mode 0 is used for a dummy block when equalizing lead-in and lead-out areas with the structure of a CD-ROM.

As shown in FIG. 11A, the data format in the mode 1 is formed by a sync part of 12 bytes storing a signal for classifying frames, a header part of 4 bytes to be described later, a user data part of 2,048 bytes (2 KB) serving as purposed information, and a spare data part of 288 bytes storing error detection and correction codes. The mode 1 is obtained by improving the error correction capacity by the spare data part, which is suited to record the data requiring reliability such as character codes or computer data.

As shown in FIG. 11B, the data format in the mode 2 is formed by a sync part of 12 bytes storing a signal for classifying frames, a header part of 4 bytes, and a user data part of 2,336 bytes serving as purposed information. The mode 2 allows all areas after the header part to be used as a user data part though the mode 2 does not include an additional error correction code, which is suited to mainly record the data whose errors can be corrected through interpolation.

As shown in FIG. 11C, the data format in the mode 2 (form 1) is formed by a sync part of 12 bytes storing a signal for classifying frames, a hear part of 4 bytes, a subheader part of 8 bytes, a user data part of 2,336 bytes serving as purposed information, and a spare data part of 280 bytes.

As shown in FIG. 1D, the data format in the mode 2 (form 2) is formed by a sync part of 12 bytes storing a signal for classifying frames, a header part of 4 bytes a subheader part of 8 bytes, a user data part of 2,324 bytes serving as purposed information, and an EDC (Error Detection Code) part of 4 bytes.

The subheader part of each of the mode 2 (form 1) and mode 2 (form 2) comprises a final number, a channel number, a submode, coding information, a final number, a channel number, a submode, and coding information which are respectively constituted of one byte.

In the case of the disk 1 of the present invention, the data to be recorded in the second part PA2 has a CD-ROM format. In this case, it is possible to use any one of a plurality of modes shown in FIGS. 11A to 11D as the mode of the CD-ROM format. Because audio data is recorded, the format of the mode 1 shown in FIG. 11A is used. The CR-ROM has a data transfer rate of 150 KB/sec.

Figure 12A:
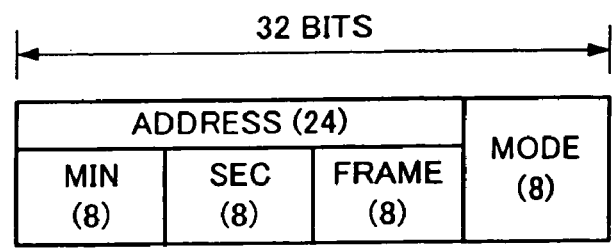
FIGS. 12A and 12B are schematic diagrams showing a format and another format of a header section in the first embodiment of the present invention.

The header part of an existing CD-ROM has the structure shown in FIG. 12A independently of a mode. That is, the header part is constituted of an absolute address part (ADDRESS) comprising 24 bits showing an absolute address of a frame by time information such as minute (MIN), second (SEC), and a frame number (FRAME) and a mode part (MODE) comprising 8 bits showing the above mode.

The absolute address part (ADDRESS) is constituted of an absolute address minute component part (MIN), an absolute address second component part (SEC), and an absolute address frame number component part (FRAME). These parts are respectively comprises 8 bits. The absolute address part (ADDRESS) is equivalent to the time information of the Q channel of the subcode of the above CD-DA (one-to-one correspondence), in which the absolute address minute component part (MIN), absolute address second component part (SEC), and absolute address frame number component part (FRAME) are respectively shown by two-digit BCD.

The CD-ROM is also provided with the above subcode part separately though not illustrated and an absolute address shown by the above "MIN", "SEC", and "FRAME" is recorded in the Q channel.

Figure 12B:
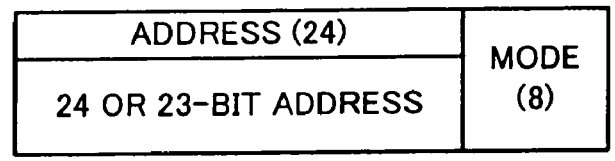

As the address notation of the CD-ROM format of the data recorded in the second part PA2, it is also permitted to use the binary notation shown in FIG. 12 in addition to the notation shown in FIG. 12A. That is, all areas of "MIN", "SEC", and "FRAME" of "header part" are shown by binary notation of 24 bits. When showing an address by a 24-bit binary number, 224 is equal to 16777216. Therefore, when assuming the data quantity of one frame as 2 KB, it is possible to show the access of data up to approx. 33 GB and correspond to a high density. When recording data in the second part PA2 at double density, it is preferable to use binary notation.

It is possible to discriminate between address information shown in accordance with BCD and an address shown in accordance with a binary number by predetermined one bit of 24 bits or a plurality of bits. For example, it is possible to use the most significant bit of 24 bits for discrimination. Discrimination can be performed by using a specific bit or a plurality of bits in addition to the most significant bit. Moreover, discrimination can be performed by using that the way of address change differs in time information and binary number. It is possible to determine the type of a disk through discrimination of the difference between address notations.

It is described that the time information in the Q channel of a subcode in CD-ROM data is the same as the case of a CD format. It is possible to show time information longer than existing one by locally correcting the time information of a subcode. That is, zero parts (ZERO) 66 and 76 in each of which 8 bits are all set to "0" are present in the time information of the subcode. By using the zero parts 66 and 76, it is possible to extend the time information. For example, information of time (HOUR) is recorded by using 8 bits and 8 bits of the zero parts 66 and 76 or low-order 4 bits and 4 bits of them. Or, 8 bits and 8 bits of the zero parts 66 and 76 or low-order 4 bits and 4 bits of them are used for notation of the place of 100 of a minute. Thus, the time information in the subcode can correspond to high density.

Then, a disk reproducing apparatus is described below by referring to FIG. 13, which reproduces the disk 1 storing audio data which is generated in accordance with a master recorded by the mastering apparatus 10, in which a linear PCM signal is recorded in the first part PA1 and compression-encoded and encrypted in the second part PA2 in accordance with a CD format.

Figure 13:
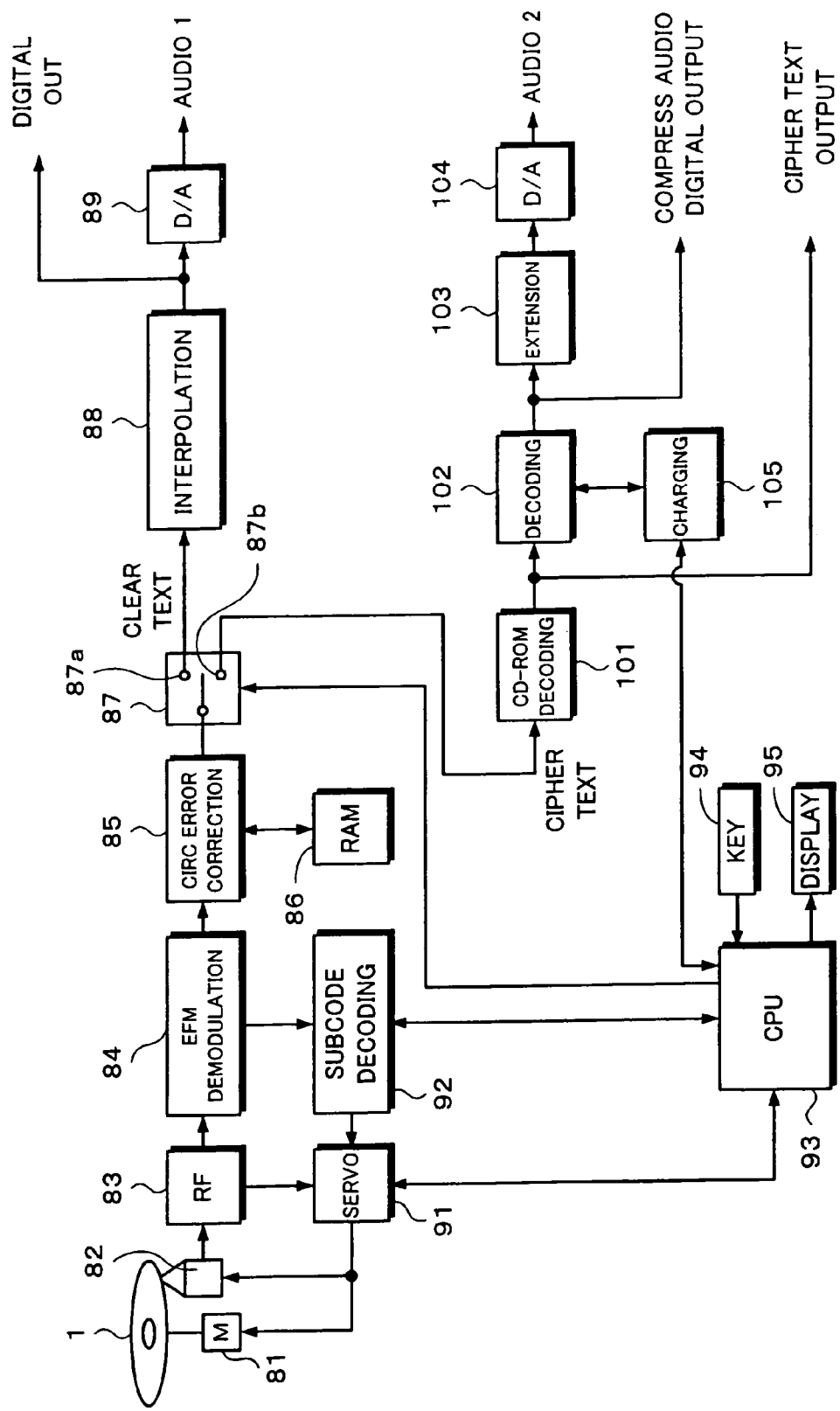
FIG. 13 is a block diagram showing a configuration of a reproducing apparatus that is the first embodiment of the present invention.

In FIG. 13, the disk 1 is rotated by a spindle motor 81 at a constant linear velocity and a signal is read from the disk 1 by an optical pickup 82. The optical pickup 82 is constituted of a semiconductor laser for applying a laser beam to the disk 1, an optical system such as an objective lens, a detector for detecting the light returned from the disk 1, and a focusing and tracking mechanism for driving the objective lens in focusing and tracking directions. Moreover, the optical pickup 82 is moved in the radius direction of the disk 1 by a not-illustrated thread mechanism. The spindle motor 81 is rotation-controlled so that the disk 1 has a linear velocity of 1.2 m/sec in accordance with the CD standard while the optical pickup 82 scans the first part PA1 by a CPU 93 to be described later and rotated so that the linear velocity becomes 0.87 m/sec while the pickup 82 scans the second part PA2 of the disk 1. Linear velocities are changed by the CPU 98 while the pickup 82 scans a mirror part between the lead-out area LO1 and lead-in area LI2.

Signals output from tetrameric detectors of the optical pickup 82 are supplied to a RF amplifier 83. The RF amplifier 83 generates a regenerative (RF) signal, a focusing-error signal, a tracking-error signal by computing signals output from the tetrameric detectors. The regenerative signal is supplied to an EFM demodulation circuit 84 and the focusing-error signal and tracking-error signal are supplied to a servo circuit 91.

The servo circuit 91 controls rotation of the spindle motor 81 in accordance with a regenerative clock of a RF signal and drives the above focusing-and-tracking mechanism in accordance with the focusing-error signal and tracking-error signal supplied from the RF amplifier 83 to perform focusing servo and tracking servo of the optical pickup 82. The EFM demodulation circuit 84 applies EFM demodulation to a RF signal supplied from the RF amplifier 83. The EFM demodulation circuit 84 outputs demodulated data in accordance with the supplied RF signal and separates subcode data from the RF signal to output the signal. The subcode data is supplied to a subcode demodulator 92. The subcode data demodulated by the subcode demodulator 92 is supplied to the servo circuit 91 and CPU 93.

The CPU 93 is constituted of a microcomputer or the like and has the function of a system controller for controlling the whole operation of a reproducing apparatus. An operating part 94 and a display part 95 are used in connection with the CPU 93. The operating part 94 is provided with an operation key similarly to the case of a normal CD reproducing apparatus and moreover, a key for designating the regeneration of the first part PA1/second part PA2. When the servo circuit 91 is controlled by the CPU 93, operations of the reproducing apparatus and the access operation to the disk 1 are controlled. The CPU 93 generates the information to be displayed on the display part 91 in accordance with the information of a subcode. Moreover, the CPU 93 controls the charging to be described later. The CPU 93 determines in accordance with subcode data supplied from the subcode demodulator 92 whether the pickup 82 scans the first part PA1 or second part PA2 of the disk 1 and supplies a control signal to the servo circuit 91 so as to control the rotation of the spindle motor 82.

Demodulated data of the EFM demodulator 84 is supplied to a CIRC error correction circuit part 85. The CIRC error correction part 85 performs error correction in accordance with a CIRC. The CIRC error correction part 85 is constituted of a C1 error correction part for correcting C1-series errors, a deinterleaving part for deinterleaving the data whose errors are corrected by the C1 error correction part, and a C2 error correction part for applying C2-series error correction to the deinterleaved data. A RAM 86 is used which serves as a buffer when the CIRC error correction part 85 corrects errors.

An output of the CIRC error correction part 85 is supplied to an input terminal of a switching unit 87. The switching unit 87 has output terminals 87a and 87b and the switching operation of the unit 87 is controlled by the CPU 93. Pieces of collateral information shown in FIGS. 4 and 5 recorded in the lead-in area LI1 are read in the CPU 93 when the disk 1 is set. The CPU 93 generates a signal for controlling the switching unit 87 by referring to a user-designated input by the operating part 94 and the read information.

To reproduce the first part PA1 of the disk 1, that is, to reproduce the first part PA1 when a user operates a key of the operating part 94, the CPU 93 controls the switching unit 87 so that the switching unit 87 selects the output terminal 87a. To reproduce the second part PA2 by operating a key of the operating part 94, the CPU 93 controls the switching unit 87 so that the unit 87 selects the output terminal 87b. An interpolation part 88 is connected to the output terminal 87a. The interpolation part 88 interpolates the data whose errors cannot be corrected by the CIRC error correction part 85. An output of the interpolation part 88 is fetched as a digital output and supplied to a D-A (digital-to-analog) conversion part 89, and an analog audio signal is output from the D-A conversion part 89. The output analog audio signal is reproduced by a loudspeaker or headphone through an amplifier. For example, when the optical pickup 82 scans the first part PA1 and reaches the lead-out area LO1, regeneration of the first part PA1 is stopped, the optical pickup 82 returns to the initial position and becomes a standby state. Moreover, when the optical pickup scans the second part PA2 and reaches the lead-out area LO2, regeneration of the second part PA2 is stopped, and the pickup 82 returns to the initial position and becomes a standby state.

A CD-ROM decoder 101 is connected to the output terminal 87b of the switching unit 87. The CD-ROM decoder 101 decomposes the CD-ROM format, detects and corrects errors, and separates the data recorded as user data. The separated data is supplied to a cipher demodulation part 102. A charging part 105 is used in connection with the demodulation part 102.

In the case of this embodiment, a case of using the DES is described as an encryption mode. The DES is one of block ciphers for performing cipher conversion every block. The DES applies cipher conversion to a 64-bit input by using a key of 64 bits (key of 56 bits and parity of 8 bits) to output 64 bits. It is also permitted to use encryption other than the DES. Though the DES is a common key mode using the same key data for encryption and demodulation, it is also permitted to use a RSA cipher that is one of public key ciphers using key data values different from each other in encryption and demodulation. Key data is supplied to a disk reproducing apparatus when the approval of a formal user or a registered user is effectuated by a host computer.

The charging part 105 performs charging in accordance with a predetermined condition when reproducing the audio data to be charged in accordance with the control by the CPU 93. Though charging will be described later, prepaid data is stored in a nonvolatile memory of the charging part 105 so that the prepaid data is reduced whenever the data is reproduced. An output of the demodulation part 102 is supplied to an extension (demodulation) part 103 for compression encoding and compression encoding is demodulated. An output of the extension part 103 is supplied to a D-A conversion part 104 and an analog audio signal of the second part PA2 is output.

Moreover, an output of the demodulation part 102 is fetched as a compressed digital audio output. For example, when audio contents of the first part PA1 are the same as audio contents of the second part PA2, it is possible to use the compressed digital audio output for dubbing. Because the output is compressed, it is possible to perform the dubbing in a very short time. Furthermore, input data of the demodulation part 102 is encrypted and output while compressed. The encrypted output is used when it is copied to other medium or transferred through a network. The output-encrypted output includes collateral information and audio data.

It is preferable that the above demodulation part 102, extension part 103, and charging part 105 are constituted as a one-chip IC and provided with the so-called tamper resistant configuration. That is, an IC in which the demodulation part 102, extension part 103, and charging part 105 are formed into one chip has a configuration in which contents of the IC cannot be known from the outside or cannot be altered.

Charging includes various types as described above Charging is roughly divided into the purchase type, the type of charging a looking-listening fee in gross, and the frequency type for charging a looking-listening fee whenever demodulating a cipher by a secure decoder. The purchase type is a type in which contents data is once purchased and thereafter, regeneration of the data is not charged. The type of charging a looking-listening fee in gross includes the monthly type of collectively paying the looking-listening fee of content data, and the type of limiting a looking-listening time.

The frequency type of charging a looking-listening fee whenever demodulating a cipher by a secure decoder can include several modes. The first mode subtracts an amount of money or frequency from a preset amount of money (prepaid card or electronic money) whenever reproducing contents data. When a balance or a remaining frequency is insufficient, it is impossible to reproduce content data. In the case of the second mode, an amount of money or a frequency is added whenever reproducing content data. A fee corresponding to an accumulated amount of money or accumulated frequency is paid in months later. When an accumulated amount of money or an accumulated frequency reaches a preset amount money or frequency, it is impossible to reproduce content data. In the case of the third mode, a frequency or an amount of money is added or subtracted in accordance with the regeneration time of content data. As described for the second mode, deferred payment can be applied to payment of a fee in addition to advance payment.

It is permitted that an amount of money or a frequency is constant or weighted in accordance with the type or content of content data. Charging is performed correspondingly to one title of contents (one melody for music) or a plurality of titles of contents (album for music).

Moreover, as a method for defining regeneration of contents, it is permitted to assume that regeneration is performed when reproducing the whole contents or regeneration is performed when the regeneration time of contents is a predetermined time or more. Furthermore, regeneration of contents for promotion to accelerate spread and circulation is not charged. Even in the case of contents to be charged, it is permitted that regeneration of the head part of contents such as regeneration of contents for 10 sec from the head is made free or regeneration of only a highlighted part of contents is made free. Thus, when contents to be charged for regeneration and contents whose regeneration is free are mixed, charging and free cases are discriminated in accordance with the collateral-information charging condition 310.

Figure 14:
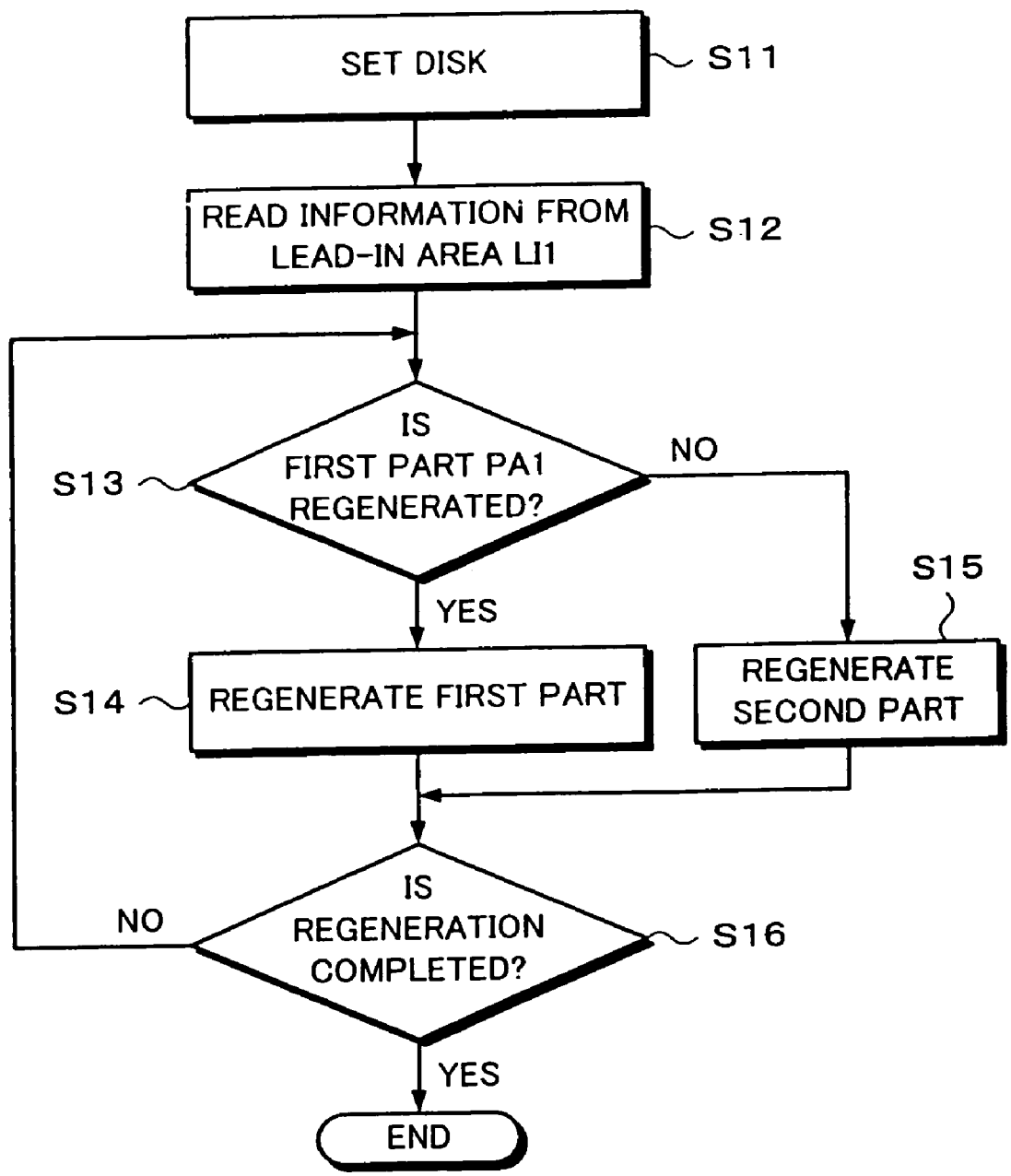
FIG. 14 is a flowchart for explaining operations of a reproducing apparatus.

FIG. 14 is a flowchart for schematically explaining the reproducing operation of the disk reproducing apparatus shown in FIG. 13 above described. In first step S11, when the disk 1 is set, the information recorded in the lead-in area LI1 is read in a memory of the CPU 93 in step S12. That is, TOC same as that of an existing CD and collateral information shown in FIGS. 4 and 5 are read in the CPU 93. The processing in step S12 is also performed when turning on the power supply of a reproducing apparatus while the disk 1 is set.

In step S13, it is determined whether to reproduce the first part PA1 of the disk 1. For example, when a user operates the operating part 94, regeneration of the first part PA1 or second part PA2 is designated. When it is determined that regeneration of the first part PA1 or second part PA2 is designated, the first part PA1 of the disk 1 is reproduced in step S14. Regeneration of the first part PA1 is the same as the case of an existing CD reproducing apparatus but its details are omitted. It is determined in step S16 whether the regeneration is completed. When it is determined that the regeneration is not completed, processing returns to step S13. When it is determined in Step S16 that the regeneration is completed, the regeneration ends.

In step S13, it is determined that the first part PA1 is not reproduced, it is regarded that the second part PA2 is reproduced and step S15 is started. Regeneration of the second part PA2 will be described later. It is determined in step S16 whether regeneration of the second part PA2 is completed. When regeneration of the second part PA2 is not completed, processing returns to step S13 and the regeneration ends when it is determined that the regeneration of the second part PA2 is completed.

Because the disk 1 meets the CD standard, it is also possible to perform regeneration not only by the disk reproducing apparatus shown in FIG. 13 but also by an existing CD reproducing apparatus. In this case, however, only audio data of the first part PA1 of the disk 1 can be reproduced.

Figure 15:
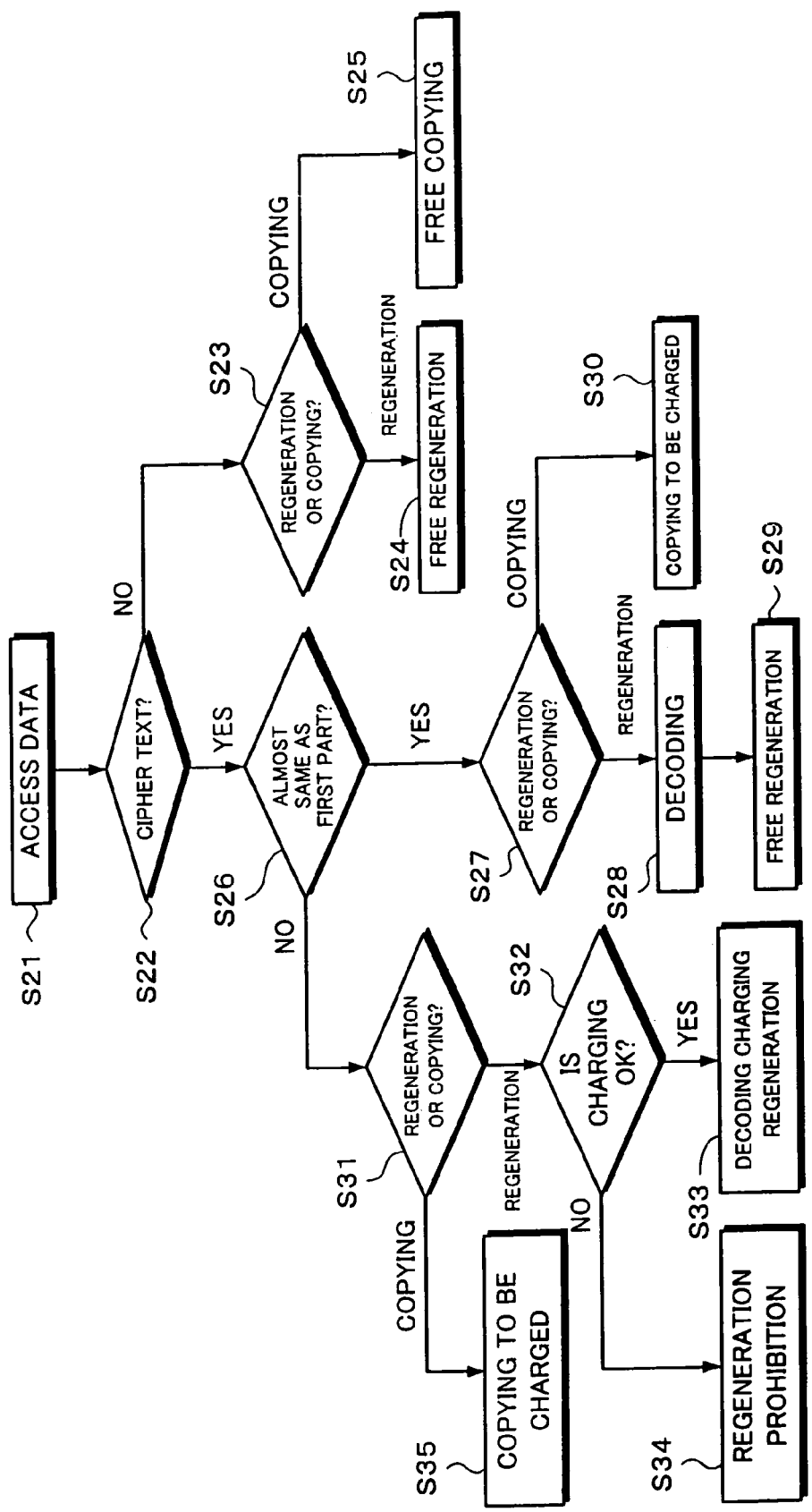
FIG. 15 is a flowchart for explaining regeneration and charging of a second part in the first embodiment of the present invention.

FIG. 15 shows regeneration (step S15) of the second part PA2 in detail. In step S21, data of the second part PA2 is accessed. Because the CPU 93 can detect the position of the second part PA2 in accordance with the collateral information read when the disk 1 is set, the optical pickup 82 is moved in the radius direction of the disk 1 when the CPU 93 designates regeneration of the second part PA2 and thereby, it is possible to access the head position of the lead-in area LI2 before the second part PA2. In this case, the motor 81 is rotation-controlled by the CPU 93 so that the disk 1 is rotated at the linear velocity of the second part PA2 such as 0.87 m/sec.

It is determined in step S22 whether the data recorded in the second part PA2 is encrypted data. When it is determined that the data is not encrypted data, the audio data recorded in the second part PA2 is determined as contents requiring no charging. In step S23, it is determined whether the data recorded in the second part PA2 should be reproduced or copied. In the case of regeneration of the data recorded in the second part PA2, the data is reproduced in step S24 free of charge. In the case of copying of the data, the data is copied in step 25 free of charge.

When it is determined in step S22 that the data recorded in the second part PA2 is encrypted data, it is determined in step S26 whether the data has almost the same contents as the contents recorded in the first part PA1 by referring to collateral information. When it is determined in step S26 that the data recorded in the second part PA2 is almost the digital signal, that is, almost the same contents recorded in the first part PA1, it is determined in step S27 whether the data recorded in the second part PA2 should be reproduced or copied. In the case of regeneration of the data, that is, the contents, the encrypted data in the second part PA2 is demodulated in step S28 and the data in the second part PA2 is reproduced free of charge in step S29. That is, because the royalty for the audio contents as the data recorded in the first part PA1 is already paid, it is not charged to reproduce the data in the second part almost the same as the data recorded in the first part PA1. In this case, the expression "almost the same" is used because the data recorded in the second part PA2 is compressed and/or encrypted compared to the data in the first part PA1. When copying is determined in step S27, the data recorded in the second part PA2 is charged and copied in step S30. Charged copying in step S30 represents copying of an encrypted and compression-encoded digital output.

When it is determined in accordance with collateral information in step S26 that the data serving as the contents recorded in the second part is not almost the same as the data serving as the contents recorded in the first part PA1, it is determined in step S31 whether the data in the second part PA2 should be reproduced or copied. When copying is determined in step S31, a user reproduces the data in step S32, it is displayed on the display part 95 in FIG. 13 whether to comply with charging, and the user operates the key of the operating part 94 to select yes or no. A charging condition is displayed on the display part 95 according to necessity and the user decides whether to comply with charging in accordance with the shown condition. For example, charging conditions including a data purchase condition and a message for inquiry are displayed n the display part 95. The user answers by operating the operating part 94 in accordance with the contents displayed on the display part 95.

When the user complies with charging in step S32, the encrypted data recorded in the second part PA2 is demodulated in step S33 and the data serving as the audio contents in the second part PA2 is reproduced. For example, by reproducing the data recorded in the second part PA2 once in step S33, the frequency of prepaid data is charged by "−1". If the user does not comply with charging in step S32, regeneration of the data in the second part PA2 is inhibited in step S34. When it is determined in step S31 that the data recorded in the second part PA2 should be copied, copying for charging is performed in step S35. The copying for charging performed in step S35 represents copying of encrypted and compression-encoded data.

Regeneration (charging) of the second part PA2 in FIG. 15 shows a case of operations but it is possible to perform any other processing in accordance with a charging condition. For example, it is permitted to perform the processing for inquiring of the user about whether to purchase the data in the second part PA2. Moreover, it is permitted to set a step for a user (or a disk reproducing apparatus) to confirm whether charging is possible in the flowchart shown in FIG. 15 and if the balance of prepaid data set in the user or reproducing apparatus is insufficient, to perform the processing for requesting the user to replenish the prepaid data. In this case, it is possible to replenish the prepaid data on-line with a bank or service center through a network or by using an exclusive charger. Moreover, when a charging condition is specified by the regeneration time or regeneration period of the data recorded in the second part PA2, it is also permitted to start a timer when charging regeneration is performed, use the elapse of the regeneration time of the data recorded in the second part PA2 and the timer, and monitor the regeneration date of the data recorded in the second part PA2.

The first embodiment of the present invention is applied to a case of using two parts for data formats of a CD and a CD-ROM. However, the present invention is not restricted to the above case. That is, as data formats of two parts, it is possible to combine a single-density CD format same as that of the so-called existing compact disk with a double-density CD format having a recording density two times larger than the existing recording density, a CD format with a DVD format, or a DVD-video format with a DVD-ROM format.

Moreover, the present invention can be applied to a recordable discoid recording medium such as a CD-RW (CD-Rewritable), CD-R (CD-recordable), DVD-RW (DVD-Rewritable), or DVD-R (DVD-Recordable). The CD-RW is a phase-change-type disk in which data can be recorded in accordance with a data format compatible with a laser-beam CD and reproduced by detecting a light quantity difference. The CD-R is a writing-once recording medium using an organic dye as a recording material and making it possible to record data only once in accordance with a data format having compatibility with a CD. Moreover, it is possible to use a data-recording medium other than an optical disk, such as a flexible disk, hard disk, or memory card.

In the case of the first embodiment of the present invention described above, uncompressed digital data is recorded in the first part PA1 of the disk 1 in accordance with the so-called CD format and compressed digital data is recorded in the second part PA2. The disk of the second embodiment of the present invention in which a watermark is put in the digital data recorded in the disk 1 is described below by referring to the accompanying drawing. In the following description, a part common to that of the above first embodiment is described by using the same designation symbol and detailed description of the part quotes the description of the common part of the first embodiment.

A water mark strong for and a water mark weak for a linear PCM signal serving as uncompressed digital data in accordance with the so-called CD standard recorded in a first part PA1 are embedded in the optical disk 1 of the second embodiment of the present invention and only a strong water mark is embedded in the compressed and/or encrypted digital data recorded in a second part PA2.

In this case, "strong" of a strong water mark and "weak" of a weak water mark respectively denote a difficulty degree of disappearance of a water mark, in other words, a strong water mark is a strong water mark having a large survival strength and not easily disappearing through signal processing such as compression applied to digital data and a weak water mark is a weak water mark having a small survival strength and disappearing through signal processing applied to digital data. For example, a strong watermark is embedded by spectrum-diffusing the data of the watermark and superimposing the diffused data on digital data serving as contents. A water mark is embedded in digital data serving as contents by a method of detecting the peak portion of a signal to be embedded in a water mark and embedding the water mark in the detected peak portion. A weak water mark is a water mark embedded by inserting the data about a water mark of copyright management information of a SCMS (Serial Copy Management System) into digital data serving as contents or low-order bits of audio data.

Figure 16:
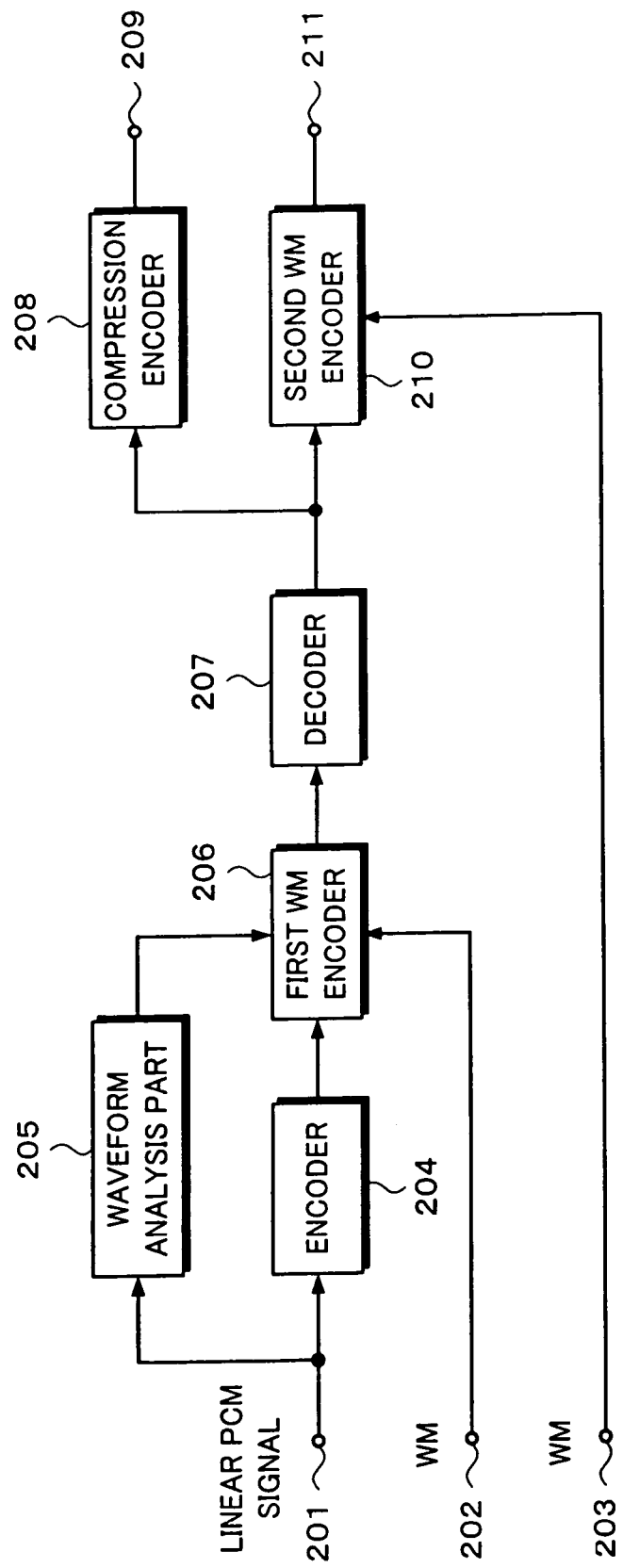
FIG. 16 is a block diagram showing a signal processing circuit for generating a linear PCM signal in which a water mark is embedded and compressed data recorded in a disk of second embodiment of the present invention.

Then, a circuit configuration for generating compressed data in which a strong water mark is embedded and a linear PCM signal serving as uncompressed audio data in which a strong water mark and a weak water mark are embedded is described by referring to FIG. 16. In FIG. 16, A linear PCM signal serving as an audio signal is supplied to an input terminal 201 from a not-illustrated signal source. The linear PCM signal supplied to the input terminal 201 is supplied to an encoder 204 and decomposed to a frequency spectrum shown in FIG. 17 in accordance with deformed DCT (Modified Discrete Cosine Transform) by the encoder 204. At the same time, the linear PCM signal supplied to the input terminal 201 is supplied to a waveform analysis part 205 by which the waveform of the supplied linear PCM signal is analyzed. An output from the encoder 204 and that of the waveform analysis part 205 are supplied to a first watermark encoder 206 and water marks are embedded in portions shown by slants of outputs supplied from the encoder 204 in FIG. 17 by using the masking effect. The power of an original spectrum is increased by embedding a mask key P(m−k) constituting a water mark and a spectrum which is originally similar to a dotted line is changed to the spectrum power shown by slants by embedding a mask key P(m+k). In this case, a water mark supplied from the input terminal 202 is embedded in a person's portion which is dull in hearing sense, such as a portion after a loud sound in accordance with an output from the waveform analysis part 205. The watermark embedded by the encoder 206 and supplied to the input terminal 202 is the above-described strong mark.

An output from the encoder 206 is supplied to a decoder 207 and the data output from the decoder 207 is returned to a linear PCM signal again by applying the conversion inverse to the deformed DCT to the data. The linear PCM signal in which the strong water mark output from the decoder 207 is embedded is supplied to a compression encoder 208 and converted to compressed audio data by the compression encoder 208. The compression encoder 208 applies compression signal processing to the linear PCM signal in which a strong water mark supplied from the encoder 207 is embedded by using a compression mode such as MP-3 (MPEG1 audio layer 3), MPEG AAC (MPEG-2 Advanced Audio Coding), or ATRAC-3 (Adaptive Transform Audio Coding 3) and outputs the signal from an output terminal 209. A strong watermark is embedded in the compressed audio output from the output terminal 209. Thus, the watermark embedded by the encoder 206 and supplied from the input terminal 202 does not disappear due to the compression by the encoder 208.

The linear PCM signal in which the strong water mark output from the decoder 207 is embedded is supplied to a second water-mark encoder 210, in which a water mark is embedded in accordance with a water mark supplied from the input terminal 203. In the case of the encoder 210, as described above, a water mark supplied to the input terminal 203 such as copyright management information, for example, SCMS is embedded in low-order bits of a linear PCM signal supplied from the decoder 207 and output from an output terminal 210. A strong watermark and a weak watermark are embedded in a linear PCM signal output from the output terminal 210. The linear PCM signal output from the output terminal 210 is supplied to the input terminal 18 of the mastering apparatus 210 shown in FIG. 6 and the compressed audio data output from the output terminal 209 is supplied to the encryption circuit 21 in FIG. 6 and recorded in the glass master 19, and thereby, the optical disk 1 is manufactured by using the technique same as the case of the above first embodiment.

Thus, in the case of the optical disk 1, a strong water mark and a weak water mark are embedded in the linear PCM signal recorded in the first part PA1 and a strong water mark is embedded in the compressed audio data recorded in the second part PA2.

Figure 18:
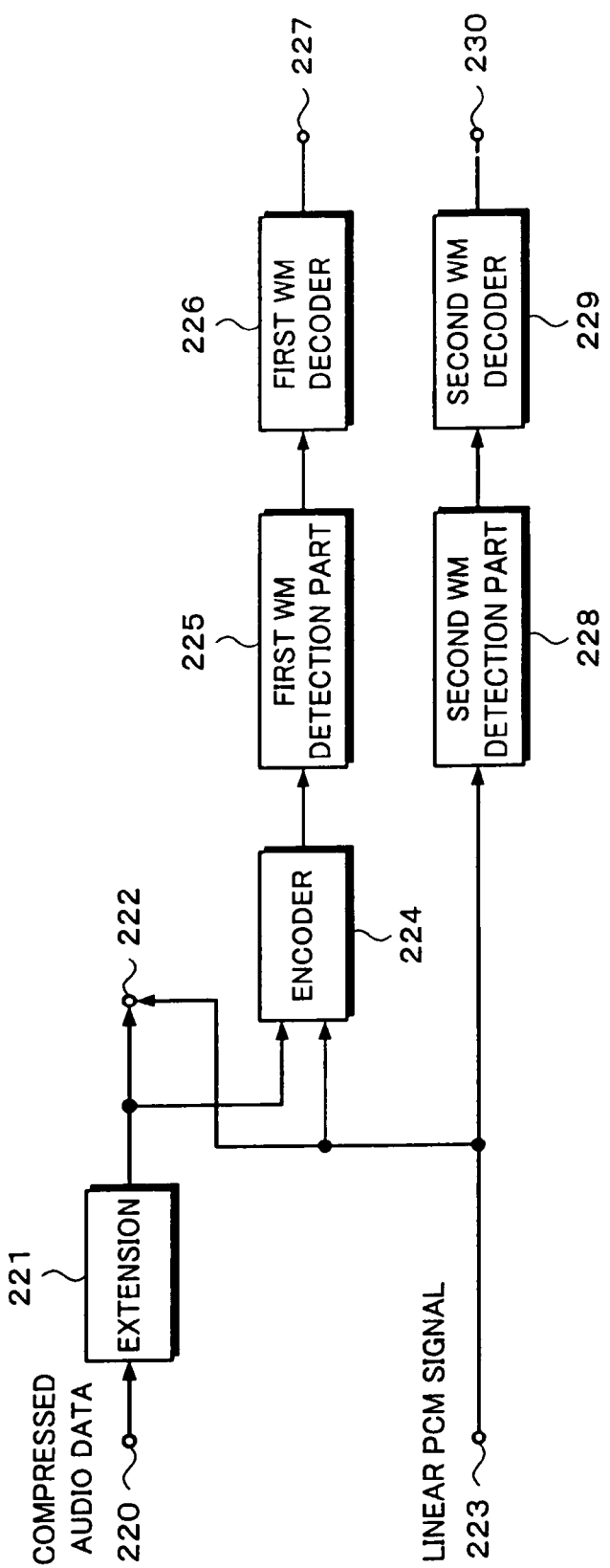
FIG. 18 is a block diagram showing a signal processing circuit for extracting water marks from a linear PCM signal and compressed data.

The optical disk 1 of the second embodiment is read by an apparatus same as the reproducing apparatus shown in FIG. 13. A watermark detecting apparatus for detecting a watermark from the optical disk 1 of the second embodiment is described below by referring to FIG. 18.

For example, the compressed audio data read from the second part PA2 serving as the data output from the demodulation circuit 102 of the reproducing apparatus shown in FIG. 13 is supplied to an extension circuit 221 through an input terminal 220. The compressed audio data is returned to a linear PCM signal by applying the processing inverse to the compression applied by the compression encoder 208 in the extension circuit 221 to the audio data, output from an output terminal 222, and supplied to the D-A converter 104. A strong watermark is embedded in a linear PCM signal output from the output terminal 222.

Figure 17:
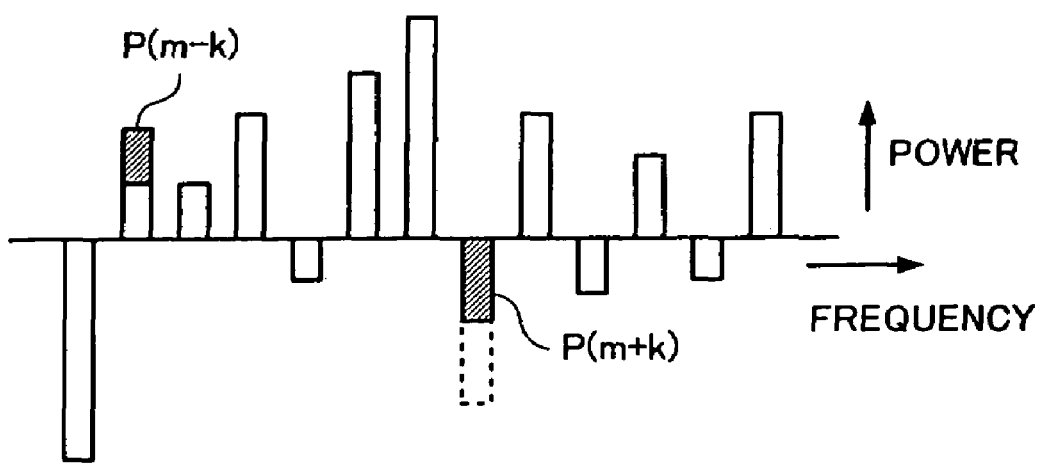
FIG. 17 is a schematic waveform diagram showing a state in which a strong water mark to be embedded in a linear PCM signal and compressed data recorded in a disk of the second embodiment of the present invention is embedded.

The linear PCM signal output from the extension circuit 221 is supplied to an encoder 224, analyzed to the frequency spectrum shown in FIG. 17 in accordance with deformed DCT, and supplied to a first water-mark detection part 225. The detection part 225 detects whether the water mark embedded as shown in FIG. 17, that is, a strong water mark is embedded, an output from the detection part 225 is supplied to a first water-mark decoder 226, and the water mark, that is, the strong water mark is decoded and output from an output terminal 227.

The linear PCM signal read from the first part PA1 serving as a digital signal supplied from the interpolation circuit 88 of the reproducing apparatus shown in FIG. 13 is output from the output terminal 222 through an input terminal 223 while a strong water mark and a weak water mark is embedded and at the same time, supplied to the encoder 224, and a strong water mark is fetched from the linear PCM signal supplied through the input terminal 223 similarly to the case of the processing applied to the linear PCM signal supplied to the encoder 224 and output from the above extension circuit 221. The linear PCM signal supplied through the input terminal 223 is supplied to a second water-mark detection part 228 by which it is detected whether a weak water mark is embedded in the supplied linear PCM signal, an output from the detection part 228 is supplied to a second water-mark decoder 229, a water mark, that is, and a weak water mark is extracted and output from an output terminal 230.

Figure 19:
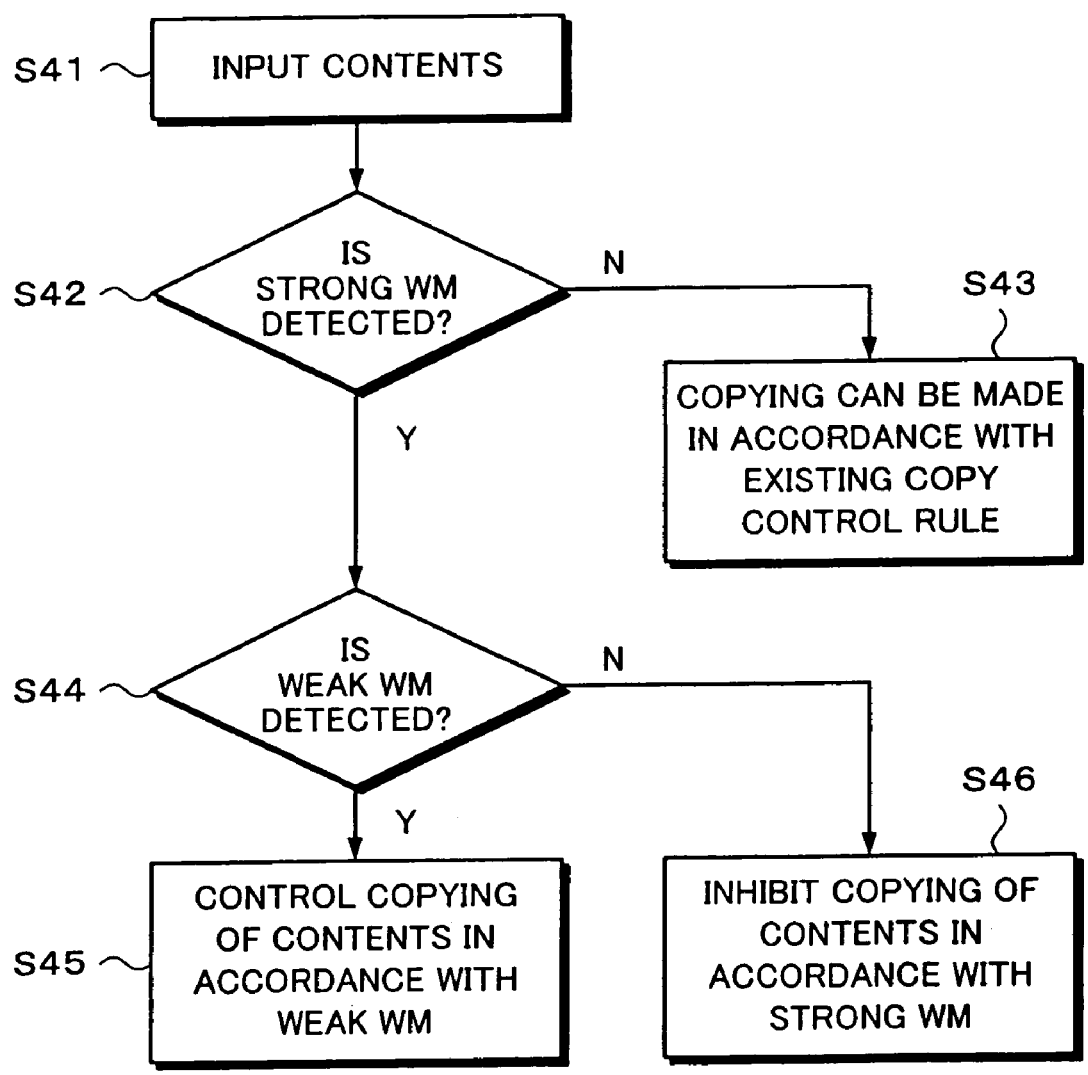
FIG. 19 is a flowchart showing the copy control performed in accordance with watermarks embedded in a linear PCM signal and compressed data.

The strong and weak water marks thus detected performs the control such as copying of the linear PCM signal serving as the contents recorded in the optical disk 1 or compressed audio data. Hereafter, description is made in accordance with the flowchart shown in FIG. 19. First, when contents such as a linear PCM signal and compressed audio data are input in step S41, it is determined in step S42 whether a strong water mark is embedded. When it is detected in step S42 that a strong watermark is not embedded, contents are copied in accordance with the copy control based on the existing SCMS in step S43. For example, the first generation of contents are copied or allowed in accordance with the SCMS. When it is determined in step S42 that a strong watermark is embedded, it is detected in step S44 whether a weak watermark is embedded. When it is detected in step S44 that a weak watermark is embedded, step S45 is started. In this case, because both the strong watermark and weak watermark are embedded, copy control is performed in accordance with the weak watermark. When the weak watermark is, for example, SCMS, copy control is performed in accordance with the SCMS and the SCMS serving as a weak watermark is written from a copy-possible sate to a copy-impossible state.

When it is detected in step S44 that a weak watermark is not embedded, step S46 is started. In this case, because only a strong watermark is left in contents, copying of contents is controlled in accordance with the strong watermark. For example, copying of contents is inhibited in accordance with the strong watermark.

As described above, a strong water mark and a weak water mark are embedded in the linear PCM signal serving as the uncompressed data recorded in the first part PA1 of the optical disk 1 of the second embodiment and a strong water mark is embedded in the compressed data recorded in the second part PA2. As a result, according to the optical disk 1 of the second embodiment, the linear PCM signal serving as the uncompressed data recorded in the first part PA1 can correctly manage a copyright in a range of the private sound recording based on the existing SCMS by a water mark and the compressed data recorded in the second part PA2 does not disappear even if the compressed data is decompressed. Therefore, it is possible to restrict or prevent illegal copying on Internet. In the case of the above example, a case is described in which a water mark strong for compressed digital data serving as compressed audio data is embedded. However, it is also permitted to embed a weak watermark in a high-order coefficient of a frequency spectrum output from the encoder 204.

Moreover, when encrypting the compressed digital data serving as compressed audio data, it is permitted to encrypt the compressed digital data after compressing a linear PCM signal in which a strong water mark supplied from the decoder 207 is embedded and applying the processing such as WAVE filing to the signal.

For the above embodiments, audio contents are described as the contents mainly recorded in a disk. However, the present invention can be also applied to the contents such as video data, static-image data, character data, computer-graphic data, or game software similarly to the case above described.

As described above, according to the present invention, it is possible to record unencrypted data and encrypted data in the same data-recording medium and correspond to various applications. For example, it is possible to record secure contents for protecting a copyright and non-secure contents such as promotion advertisements in the same medium.

Moreover, according to the present invention, it is possible to easily start or stop charging by determining whether to perform charging in accordance with whether encryption is performed.

Furthermore, according to the present invention, it is possible to communicate the information of charging while accelerating circulation of contents by permitting copying with no generation restriction. Therefore, it is possible to effectively protect copyrights in the society in which networks are advanced.

The invention claimed is:

1. A disk to be reproduced by a reproducing apparatus comprising:
   first management area configured to record first management data managing first data;
   first recording area configured to record said first data;
   second management area configured to record second management data managing a second data; and
   second recording area configured to record said second data;
   wherein said first data are unencrypted data and at least part of said second data are encrypted data;
   wherein said compression rates of said first data and said second data are different; and
   wherein said first management area are formed on an inner track side of said first recording area and said second management area are formed on an outer track side of said first recording area.

2. The disk according to claim 1, wherein said first data and said second data have different contents.

3. The disk according to claim 1, wherein said first data and said second data have identical contents.

4. The disk according to claim 1, wherein said first data are uncompressed data and said second data are compressed data.

5. The disk according to claim 1, wherein a data management area in which management information showing whether said second data are recorded is formed on said recording medium.

6. The disk according to claim 1, wherein a data management area in which management information showing whether said first data and second data are identical is formed on said recording medium.

7. The disk according to claim 1, wherein data management information showing positions of said first data and said second data is recorded in said recording medium.

8. The disk according to claim 1, wherein said first data and said second data have different data formats.

9. The disk according to claim 1, wherein said recording medium is a discoid recording medium.

10. The disk according to claim 9, wherein said first recording area is formed at an inner-track side and said second recording area is formed at an outer-track side.

11. The disk according to claim 9, wherein said data recorded in said first recording area and said data recorded in said second recording area have different compression rates based on a track pitch, a linear velocity, and a data format.

12. The disk according to claim 1, wherein said second data recorded in said second recording area are data of a fee to be charged when reproduced and data for charging a fee are recorded in a data management area.

13. A data recording method for recording data in a recording medium whose recording area is divided into at least first and second recording areas, comprising the step of:
   recording first management data which are unencrypted data in a first management recording area and recording second management data at least a part of which are encrypted in a second recording area, wherein compression rates of said first data and said second data are different,
   wherein said first management area is on an inner track side of said first recording area and said second management area is formed on an outer track side of said first recording area.

14. A data recording apparatus for recording data in a recording medium whose recording area is divided into at least first recording area of an inner track side and a second recording area of an outer track side, comprising:
   recording means for recording first management data which are unencrypted data in said first recording area of said inner track side and recording second management data at least a part of which are encrypted in said second recording area of said outer track side, wherein compression rates of said first data and said second data are different.

* * * * *

UNITED STATES PATENT AND TRADEMARK OFFICE
CERTIFICATE OF CORRECTION

| | | |
|---|---|---|
| PATENT NO. | : 7,242,767 B2 | Page 1 of 2 |
| APPLICATION NO. | : 11/128685 | |
| DATED | : July 10, 2007 | |
| INVENTOR(S) | : Yoichiro Sako and Tatsuya Inokuchi | |

It is certified that error appears in the above-identified patent and that said Letters Patent is hereby corrected as shown below:

On the Title Page Item (30) please insert under Related U.S. Application Data
-- Foreign Application
Japan 326091/1999    11/16/1999
Japan 334979/1999    11/25/1999 --

On the Title Page, Item (57)
Line 2, after "format" insert -- the --
Line 3, replace "Wreck" with -- Track --
Line 11, after "density" insert -- the --
Line 12, replace "time" with -- times --

Column 1, line 24, replace "comatible" with -- compatible --
Column 1, line 40, after "including" insert -- the --
Column 1, line 42, after "as" insert -- the --
Column 1, line 48, replace "copy" with -- copying --
Column 2, line 43, after "medium" insert -- , --
Column 2, line 56, after "where" insert -- "a" --
Column 6, line 49, replace "to be" with -- is --
Column 9, line 58, replace "are" with -- is --
Column 9, line 63, replace "tile" with -- title --
Column 14, line 41, delete "the"

Column 18, line 53, after "above" insert -- . --
Column 24, line 13, replace "performs" with -- perform --
Column 24, line 56, after "on" insert -- the --
Column 25, line 37, replace "are" with -- is --

UNITED STATES PATENT AND TRADEMARK OFFICE
CERTIFICATE OF CORRECTION

PATENT NO. : 7,242,767 B2
APPLICATION NO. : 11/128685
DATED : July 10, 2007
INVENTOR(S) : Yoichiro Sako and Tatsuya Inokuchi It is certified that error appears in the above-identified patent and that said Letters Patent is hereby corrected as shown below:

Column 25, line 39, replace "are" with -- is --
Column 26, line 40, after "least" insert -- a --

Signed and Sealed this

Nineteenth Day of August, 2008

JON W. DUDAS
*Director of the United States Patent and Trademark Office*